US012128701B2

(12) United States Patent
Babaei et al.

(10) Patent No.: US 12,128,701 B2
(45) Date of Patent: Oct. 29, 2024

(54) FABRICATION OF MOIRÉ ON CURVED SURFACES

(71) Applicants: Vahid Babaei, Saarbrücken (DE); Roger D. Hersch, Epalinges (CH); Artin Saberpour Abadian, Saarbrücken (DE); Rhaleb Zayer, Saarbrücken (DE); Hans-Peter Seidel, Sankt Ingbert (DE)

(72) Inventors: Vahid Babaei, Saarbrücken (DE); Roger D. Hersch, Epalinges (CH); Artin Saberpour Abadian, Saarbrücken (DE); Rhaleb Zayer, Saarbrücken (DE); Hans-Peter Seidel, Sankt Ingbert (DE)

(73) Assignee: Innoview Sarl, Epalinges (CH)

( * ) Notice: Subject to any disclaimer, the term of this patent is extended or adjusted under 35 U.S.C. 154(b) by 694 days.

(21) Appl. No.: 17/242,444

(22) Filed: Apr. 28, 2021

(65) Prior Publication Data

US 2022/0355609 A1 Nov. 10, 2022

(51) Int. Cl.
*B42D 25/342* (2014.01)
*B29D 11/00* (2006.01)
*B44F 1/06* (2006.01)

(52) U.S. Cl.
CPC ............ *B42D 25/342* (2014.10); *B29D 11/00* (2013.01); *B44F 1/06* (2013.01)

(58) Field of Classification Search
CPC ......... B42D 25/342; B29D 11/00; B44F 1/06; B44F 1/10; G02B 3/06; G02B 27/60; G02B 5/1842
See application file for complete search history.

(56) References Cited

U.S. PATENT DOCUMENTS

| | | | |
|---|---|---|---|
| 7,305,105 B2 | 12/2007 | Chosson et al. | |
| 7,751,608 B2 | 7/2010 | Hersch | |
| 10,286,716 B2 | 5/2019 | Hersch et al. | |
| 2017/0113481 A1* | 4/2017 | Hersch | G02B 30/27 |

OTHER PUBLICATIONS

Walger et al ("Level Line Moires by Superposition of Cylindrical microlens gratings", Journal of the Optical Society of America, Feb. 2020) (Year: 2020).*

(Continued)

*Primary Examiner* — Joseph P Martinez
*Assistant Examiner* — Ray Alexander Dean

(57) ABSTRACT

Moiré is an appealing visual effect observable when two or more repetitive patterns are superposed. We introduce a method for designing and fabricating level-line moirés on curved surfaces. These moiré shapes are obtained by superposing a partly absorbing or partly light deviating curved base layer and a curved revealing layer formed by a grating of transparent lines or cylindrical lenses. The distances between base layer and revealing layer are adapted to the locally varying distances between successive transparent lines or cylindrical lenses of the curved revealing layer grating. We demonstrate the quality of our method by rendered simulations and by fabrication. The resulting level-line moiré display devices can be manufactured using different fabrication techniques, from multi-material 3D printing to molding.

8 Claims, 21 Drawing Sheets

(56) References Cited

OTHER PUBLICATIONS

Saberpour et al ("Fabrication of Moire on Curved Surfaces", Optics Express, Jun. 2020) (Year: 2020).*

I. Amidror, The theory of the moiré phenomenon, 2nd edition, vol. 1, section 11.2, pp. 353-360 and pp. 370-371, Springer (2009).

H. Kamal, R. Völkel, J. Alda, Properties of the moiré magnifiers, Optical Engineering, vol. 37, No. 11, pp. 3007-3014 (1998).

V. J. Cadarso, S. Chosson, K. Sidler, R. D. Hersch, and J. Brugger, "High-resolution 1d moirés as counterfeit securityfeatures", Light. Sci. & Appl. vol. 2, e86 (2013).

T. Walger; T. Besson; V. Flauraud; R. D. Hersch; J. Brugger, "1D moiré shapes by superposed layers of micro-lenses", Optics Express. Dec. 23, 2019, vol. 27, No. 26, pp. 37419-37434.

T. Walger; T. Besson; V. Flauraud; R. D. Hersch; J. Brugger, Level-line moirés by superposition of cylindrical microlens gratings, Journal of the Optical Society of America. Jan. 10, 2020. vol. A37, No. 2, pp. 209-218.

T. Weyrich, P. Peers, W. Matusik, and S. Rusinkiewicz, "Fabricating microgeometry for custom surface reflectance," ACM Trans. Graph., vol. 28, Issue 3, Article 32, (2009).

M. Papas, W. Jarosz, W. Jakob, S. Rusinkiewicz, W. Matusik, and T. Weyrich, "Goal-based caustics," in Computer Graphics Forum, vol. 30 (Wiley Online Library, 2011), pp. 503-511.

Y. Schwartzburg, R. Testuz, A. Tagliasacchi, and M. Pauly, "High-contrast computational caustic design," ACM Transactions on Graph. (TOG) vol. 33, Issue 74 (2014).

E. Hecht, Schaum Outlines of Optics, Chapter 4, Section 4.3, "Spherical refracting surfaces," p. 54, (1975).

J. Tompkin, S. Heinzle, J. Kautz, and W. Matusik, "Content-adaptive lenticular prints", ACM Transactions on Graph.(TOG) vol. 32, Article 133, (2013).

V. Babaei, J. Ramos, Y. Lu, G. Webster, and W. Matusik, "Fabsquare: Fabricating photopolymer objects by mold 3dprinting and UV curing," IEEE computer graphics applications, vol. 37, 34-42 (2017).

* cited by examiner

131

132

133

134

FABRICATION OF MOIRÉ ON CURVED SURFACES

The present patent application is a continuation-in-part of U.S. patent application Ser. No. 16/881,396 filed 22 of May 2020, inventor Roger D. Hersch, herein incorporated by reference.

BACKGROUND

Let us briefly review approaches that are closely related to the present disclosure. References to non-patent literature are placed into square brackets. The corresponding detailed publication information is placed at the end of the present description.

Moiré Synthesis

Printing is the most common way of creating a wide range of moiré effects. Usually, a revealing layer (often a grating of horizontal transparent lines) is printed and superposed on a base layer incorporating repetitive structures. The superposition results in a message, motif or image that can be animated by having the revealing layer sampling successive positions of the base layer.

Orientations, periods as well as the moiré intensity profile of moiré fringes can be modeled by considering the superposition of the layers as a multiplication in the spatial domain, and therefore as a convolution in the spatial-frequency domain. The so-called 1D moiré is obtained by smoothly shifting the revealing layer on top of a base layer made of repetitive bands (also called "stripes") containing each the vertically compressed motif that is to appear as moiré shape. The change of relative phase between revealing and base layers yields animated moiré symbols and motifs having different speeds and orientations, see U.S. Pat. No. 7,751,608 to Hersch and Chosson. The use of a 2D lens array acting as a revealer sampling a 2D array of micro images in order to obtain a 2D moiré has been known for a long time [Kamal, Voelkel and Alda 1998]. When the revealer samples successive portions of the base, 1D or 2D moiré shapes move dynamically along known trajectories. In contrast, with level-line moirés characterized by a same repetition period of both the base and the revealing layers, shifting the revealer over the base changes its phase relative to the base and induces therefore a strong beating effect. Recently, micro-fabrication techniques have been used to realize moiré patterns where the revealing layer [Cadarso et al. 2013] or both the revealing and base layers, are made of cylindrical micro-lens arrays, see U.S. Pat. No. 10,286,716 to Hersch et al., herein incorporated by reference, as well as [Walger et al. 2019] and [Walger et al. 2020]. Parts of the present disclosure can be thought of as a non-obvious extension of the dual-lens based planar level-line moiré (U.S. Pat. No. 10,286,716) to curved surfaces.

Synthesis of Caustics

Caustics are obtained by devices that reflect or refract light into a surface according to a desired intensity profile, for example a multi-intensity image. Researchers fabricated slabs that guide the incoming light to form a desired distribution on a receiving surface through optimizing the slopes of a set of microfacets [Weyrich et al. 2009]. This work is later extended to refractive surfaces made of a collection of curved patches [Papas et al. 2011]. Additional optimizations are introduced to stress the importance of surface continuity in order to improve the contrast of the resulting caustics [Schwartzburg et al. 2014]. In the present contribution, we show that high-quality curved surface moirés also require the continuity of the underlying geometry. Unlike the static intensity images generated by caustics, the surface moiré exhibits a dynamic nature and can be embedded in a wide range of curved surfaces.

Light Field Display Fabrication

Our work is related to light-field displays embodied by lenticular prints [Tompkin et al. 2013]. We draw insights from this work but show that its extension to curved surfaces does not yield high quality moirés.

Level-Line Moiré

The level-line moiré theory [Amidror 2009 pp. 370-371] states that the level lines of an elevation profile appears as moiré lines when superposing an unshifted line grating on a base line grating whose lines are locally shifted in proportion to the local elevation values of the elevation profile. See FIG. 1 for an example of a level-line moiré.

The general equation of the level-line moiré can be determined by considering the indexed line families of the revealer (also called "revealing layer"), the base (also called "base layer") and the moiré, see [Amidror 2009 sec.11.2 pp. 353-360 and pp. 370-371]. As shown in FIG. 18, the transparent lines of the revealer are indexed with r=1, 2, 3, . . . , the base lines are indexed with b=1, 2, 3, . . . , and the moiré lines are indexed with m= . . . 2, 1, 0, −1, −2 . . .

The index m characterizing the moiré fringe lines is equal to the index of the revealer minus that of the base:

$$m = r - b \quad (1)$$

Let us now consider a revealer composed of a periodic grating of lines, which can be straight or curvilinear. Let us define a function $\rho(x,y)$ such that the implicit equation of one of these lines is $\rho(x,y)=0$.

The family of revealer lines is thus defined by:

$$\rho(x,y) = r \cdot T_r \quad (2)$$

where r is the index of the lines in the revealer and $T_r$ is the period of the lines in the revealer.

For example, $y = r \cdot T_r$ would represent a grating of horizontal lines of period $T_r$.

Similarly, let us consider a base composed of a periodic grating of lines, which can be straight or curvilinear. Let us define a function $\beta(x, y)$ such that the implicit equation of one of these lines is $\beta(x, y)=0$.

The family of base lines is thus defined by:

$$\beta(x,y) = b \cdot T_b \quad (3)$$

where b is the index of the lines in the base and $T_b$ is the period of the lines in the base.

The implicit equation of the moiré grating can then be obtained by combining Eq. (1), Eq. (2), and Eq. (3):

$$\frac{\rho(x, y)}{T_r} - \frac{\beta(x, y)}{T_b} = m \quad (4)$$

As stated in the level-line moiré theorem formulated in [Amidror 2009 section 11.2, pp. 353-360, 370-371], the level lines of a surface (called elevation profile, FIG. 1, 101) defined by a function $z=g(x,y)$ can be obtained by superposing two gratings. The first grating is a revealing layer grating of horizontal transparent lines having a repetition period T (FIG. 1, 103). The second grating is a base layer grating 102 that has the same layout as the revealing layer grating, in which in addition, each point (x,y) is translated perpendicularly by a distance proportional to g(x,y).

We consider horizontally laid out base and revealing layer gratings, with the y-axis pointing vertically towards the top. The line equations of the revealer and the base are respectively:

$$y = r \cdot T \quad (5)$$

$$y - g(x,y) = b \cdot T \quad (6)$$

The resulting moiré is defined by the indicial equation Eq. (1). After replacing r and b thanks to Eq. (5) and Eq. (6), we obtain:

$$m = \frac{y}{T} - \frac{y - g(x,y)}{T} = \frac{g(x,y)}{T} \Leftrightarrow g(x,y) = m \cdot T \quad (7)$$

This means that the moiré lines are indeed level lines of the surface z=g(x,y).

For level line moirés, the revealing layer is formed by a grating of sampling lines. These sampling lines can be embodied by transparent lines as described above or by cylindrical lenses.

SUMMARY

We disclose a method for producing level-line moirés on a curved surface formed by a curved revealing layer made of a grating of sampling lines such as cylindrical lenses superposed with a curved base layer formed by a grating of bands. This method comprises the following steps.

(1) Description of the target curved surface on which the level-line moiré is to appear, for example as a parametric surface. Considered parametric surfaces are cylinders, spheres, ellipsoids, paraboloids, saddle surfaces (hyperbolic paraboloid), hyperboloids, and cones.

(2) Creation of a planar level-line moiré design by selecting an elevation profile, by defining the common repetition period of a planar revealing layer grating of cylindrical lenses or transparent lines and of a planar base layer grating of bands and by shifting the grating of bands in proportion to the elevation profile.

(3) Projection of the planar revealing layer of cylindrical lenses or of transparent lines onto the target curved surface thereby obtaining the pitch surface. In the case of a revealing layer grating made of cylindrical lenses, the pitch surface is defined by the pitch lines (FIG. 4A, 410) located at the intersections of neighboring cylindrical lens arc surfaces 401. In the case of a revealing layer made of a grating of transparent lines, the pitch lines are the border lines at the transitions between the transparent lines and the dark lines.

(4) In the case of a revealing layer grating made of cylindrical lenses, calculation of the curvature radii of the cylindrical lens shapes that are placed onto the pitch surface.

(5) Laying out the base layer grating of bands at calculated distances below the pitch surface. These distances are equal or larger than the curvature radii of the cylindrical lenses located above them, generally between 1 to 3 times the sizes of the curvature radii.

(6) Creation of the meshes of the resulting curvilinear base and revealing layers.

(7) Fabrication the curved surface moiré device with the created meshes.

The elevation profile represents a recognizable shape that is reproduced as a level-line moiré on the resulting fabricated curved surface moiré device.

In an embodiment with a revealing layer grating of cylindrical lenses, the base bands of the base layer may be formed by tiles having partly transparent and partly opaque or reflecting regions that create across the individual bands an intensity gradient. The curvature radii of the cylindrical lens sections can be calculated so as to ensure a constant angular field of view. Experience has shown that dimensioning the cylindrical lenses so as to ensure a constant angular field of view is one of the conditions for obtaining a high-quality level-line moiré. The recognizable shape embedded into the elevation profile and reproduced as a level-line moiré may represent the following items: written words, typographic characters, numbers, flags, logos, graphic motifs, decorations, drawings, clip art, faces, houses, trees, humans and animals.

In a dual-lens embodiment, the base bands of the base layer are formed by cylindrical lenses that direct light from behind the curved level-line moiré surface towards the cylindrical lenses of the revealing layer. Shifting the base bands shifts the corresponding cylindrical lenses and has the effect of directing light from different orientations towards the observer. The shifted cylindrical lenses have a light deviating behavior.

When observing the fabricated curved surface moiré device from different angles, or when tilting it, dynamically beating moiré shapes appear. These beating shapes are produced by having different parts of the moiré evolving from bright to dark and from dark to bright, while keeping the contrast within the moiré image. These beating shapes do not fundamentally change the general aspect or shape of the level-line moiré.

When trying to create a new curved moiré device, one may experiment by simulating the resulting level-line moiré as a function of the free parameters. One may enhance step (5) of the moiré synthesizing method described above with the following sub-steps:

(a) create the focal surface according to the focal distances measured from the top of the cylindrical lenses;

(b) create offset surfaces that have constant offsets from the pitch surface;

(c) create interpolation surfaces between focal and offset surfaces;

(d) simulate the curved moiré obtained by said interpolation surfaces;

(e) select the set of parameters of the interpolation surface and its corresponding meshes that yield the visually highest quality moiré; and fabricate the curved moiré device.

As a further alternative one may fit as base layer surface an approximation surface through a grid of variable offsets. In case of lens-based revealing layers, these offsets are obtained by multiplying the corresponding focal lengths with a proportionality constant having preferably a value between ⅓ and 1 or by multiplying the lens radii with a value between 1 and 3. For transparent line based revealing layers, the offsets have preferably a value between ¼ and 4 times the corresponding pitch sizes, i.e. the distances between neighboring pitch lines.

Possible fabrication technologies comprise 3D printing with at least two materials, in transmission mode, a clear material and an opaque or absorbing material and in reflection mode a transparent material and a reflecting material.

An alternative method consists in combining 3D printing and spray coating. The curved revealing layer grating of cylindrical lenses or of transparent lines is separately 3D printed. Then a base mask is formed by base mask bands which are perpendicularly shifted according to the selected elevation profile. The mask surface incorporates along its bands a repetitive shape forming a hole that creates an intensity gradient within each band, perpendicular to the non-shifted band's orientation. Such a gradient shape can for example be a "L" shape (FIG. 2, 203, FIG. 24) or a triangular shape (FIG. 22, 2250). The resulting base mask surface is projected into the bottom surface of the revealing layer grating (FIG. 21, 2126). Metallic particles are deposited by spray coating onto the masked bottom surface. The particles traversing the holes reach the bottom surface 2126. After removing the mask, the resulting opaque metallic gradient shapes form the base layer. Instead of metal, other particles containing for example colorants could be spray coated into the masked bottom surface.

A further fabrication technology for producing large number of curved level-line moiré items is mold casting. It implies the fabrication of a mold whose surface is the negative of the surface of the curved surface moiré device.

We also disclose a curved surface moiré device that comprises on its front a revealing layer grating of cylindrical lenses or of transparent lines and on its back a base layer grating with partly shifted bands. When observing the fabricated curved surface moiré device from different angles, or when tilting it, beating moiré shapes appear whose different parts evolve from bright to dark and from dark to bright, without fundamentally changing their general aspect. When tilting the device, in addition to the beating effect, a low frequency bright-dark band traverses the device in a direction perpendicular to the revealing layer grating of cylindrical lenses.

In one embodiment, the partly shifted bands are formed by tiles with partly transparent and partly opaque or reflecting regions that create across the individual bands an intensity gradient. In a second embodiment, the bands of said base layer are formed by cylindrical lenses. The partly shifted bands are embodied by shifts of the corresponding cylindrical lenses and have the effect of directing the light from behind from different orientations towards the observer.

In the further embodiment, where the revealing layer is formed by a grating of transparent lines, the pitch lines of the revealing layer surface are defined at the transitions between the transparent and the dark lines of the revealing layer grating. The base layer grating is preferably laid out at offsets below the revealing layer grating surface that are proportional to the pitch size, i.e. the distance between neighboring pitch lines. The corresponding proportionality factor is between ¼ and 5 times the pitch size. The base layer grating surface smoothly approximates the discrete set of offset locations, similarly to smooth surface 603 (dotted line) approximating the discrete locations at the discontinuities of surface 602 (continuous broken line, FIG. 6).

The moiré displayed on the curved surface moiré device is a recognizable shape selected from the set of words, letters, numbers, flags, logos, graphic motifs, decorations, drawings, clip art, faces, houses, trees, landscape, humans and animals. The curved surface moiré device can be conceived on an item selected from the set of decorative packages, aesthetical items, home decorations, lampshades, necklaces, fashion clothes, cars, outdoor decorations, architectural elements and illumination devices. The curved surfaces selected for creating a curved surface moiré device can be selected from the set of paraboloid surfaces, saddle surfaces, conic surfaces, sphere surfaces and ellipsoid surfaces.

BRIEF DESCRIPTION OF THE DRAWINGS

FIG. 5B, 511 shows fitted lenses with equal radii (r), resulting in different angular field of views (AFOV) and 512 shows lenses with radii adapted for each lens, ensuring a constant angular field of view a;

FIGS. 11, 111 and 112 show the photographs of a 3D printed dual-lens level-line surface moiré on a saddle surface, obtained by slightly tilting the device vertically;

FIGS. 12, 121 and 122 show the photograph of a silicone cast of a dual-lens level-line surface moiré captured from two different angles;

FIGS. 13, 131, 132, 133 and 134 show the elevation profiles of the "David", "Mosque", "Flower" and "Graces" design motives, respectively;

FIGS. 14, 141 and 142 show a photograph of the 3D printed paraboloid surface with the "David" level-line surface moiré obtained by tilting the device vertically, in a direction perpendicular to the horizontally laid out revealing layer cylindrical lenses;

FIGS. 15, 151 and 152 show a photograph of the 3D printed paraboloid surface with the "Flower" level-line surface moiré captured from two different angles;

FIGS. 16, 161 and 162 show the photograph of the 3D printed saddle surface with the "Mosque" level-line surface moiré captured from two different angles.

FIGS. 17, 171 and 172 show the photograph of the 3D printed saddle surface with the "David" level-line surface moiré captured from 2 different angles.

DESCRIPTION OF THE INVENTION

We consider a special class of moirés, namely the level-line moiré, see U.S. Pat. No. 7,305,105 and [Amidror 2009]. In sections "Lens-based planar moiré" and "3D extension of the lens-based level-line moiré", we explain the principles of lens-based level-line moiré design, accounting for free parameters such as the lens radius or the focal length. In section "Base-layer surface design" we introduce our method of positioning the base and revealing layer surfaces relative to each other. In section "Dual-lens surface moiré", we show that our framework is extendable to a special type of single-material moiré where both the base and the revealing layers are made of cylindrical lens arrays, see U.S. Pat. No. 10,286,716.

In section "Simulation and fabrication" we show a variety of examples, both simulated and fabricated, demonstrating high-quality moiré effects on different curved surfaces.

Lens-Based Moiré

Figure 1:
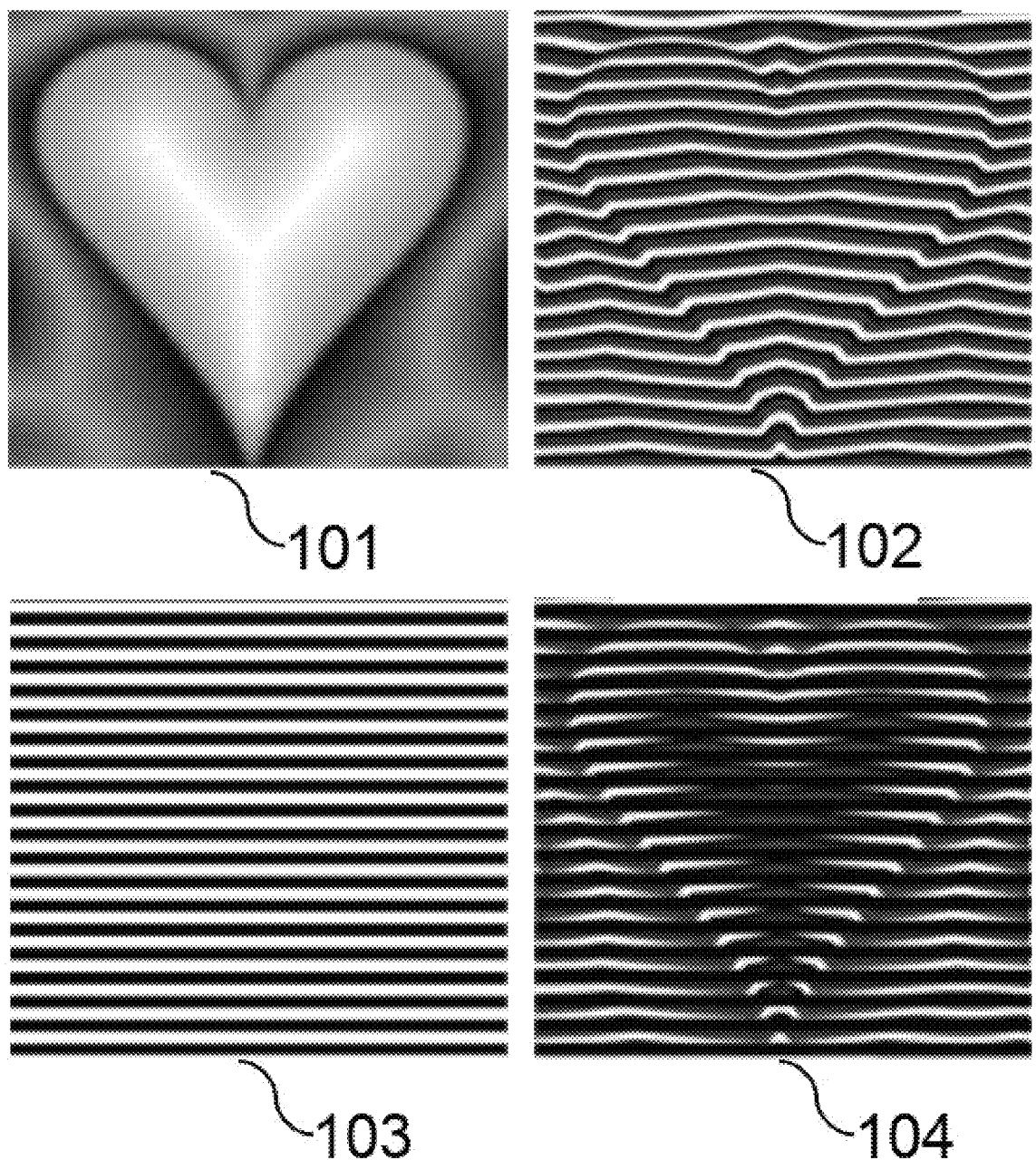
FIG. 1, 101 shows an elevation profile obtained by a input grayscale image, 102 shows the base layer shifted in proportion to the elevation profile, 103 shows the revealing layer formed by transparent lines and 104 shows the superposition of the base and revealing layers yielding the level-line moiré.

Section "Level-line moiré" in the "Background" part of the present disclosure gives a useful mathematical description of the level-line moiré. For creating a level-line moiré, the base layer is calculated from an elevation profile extracted from a typographic character, a text, a motif or an image (FIG. 1, 101). It is formed by horizontally laid out replicated line patterns, shifted vertically in proportion to the elevation at that location (FIG. 1, 102). Superposing a rectilinear line grating made of transparent lines (FIG. 1, 103) on this base layer produces a moiré whose constant colors or intensities 104 follow the level lines of the elevation profile.

Figure 2:
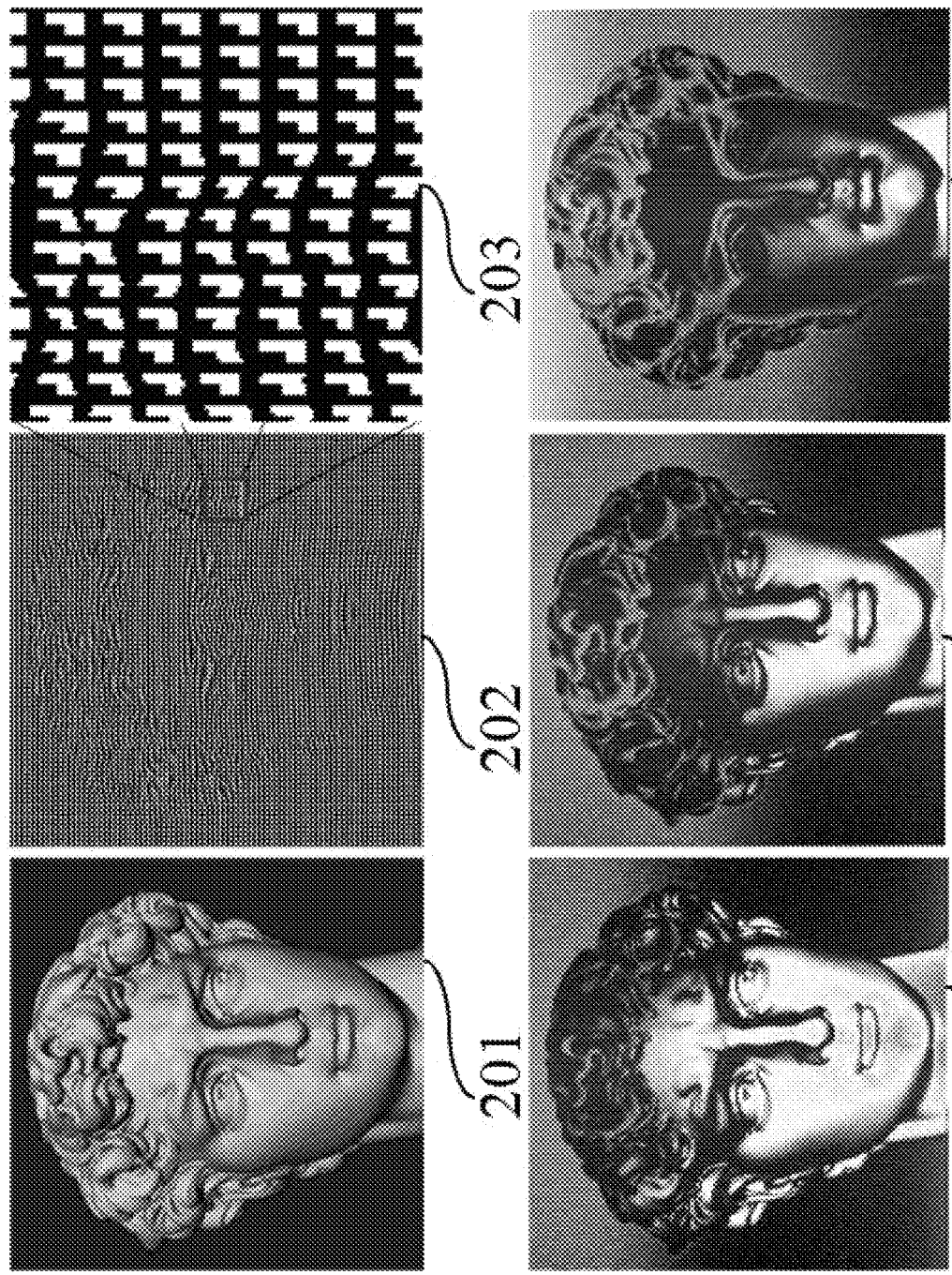
FIG. 2, 201 shows an elevation profile derived from Michelangelo's "David" grayscale image; 202 shows the base layer shifted in proportion to the elevation profile and 203 an enlargement of it; 211, 212 and 213 show the level-line moiré at different tilt angles obtained by the superposition of the base and the revealing layers, where the base and/or the revealing layer have a certain thickness.

A planar level-line moiré device relying on a revealing layer embodied by an array of cylindrical lenses incorporates a base layer (FIG. 2, 202) made of unidirectional structures having the same orientation as the cylindrical lenses of the revealing layer, shifted perpendicularly in proportion to an elevation profile. An enlargement of the base-layer band structure is shown in FIG. 2, 203. The base must have the same repetition period as the lens pitch, resulting in a one to one correspondence between cylindrical lenses and base layer bands (also called "base layer stripes"). The (superposition of the cylindrical lens array on the base layer yields the moiré. In this moiré, the level lines of the elevation profile are displayed as constant intensity lines (FIGS. 2, 211, 212 and 213). Moiré areas of high gradients 211, 212 and 213 correspond also to high gradients in the elevation profile 201.

The level-line moirés is characterized by the same repetition period of both the base and the revealing layers. Tilting the level-line moiré device has the same effect as shifting the revealing layer over the base layer. The tilting action changes the location of revealing layer sampling lines, which is equivalent to a shift of the revealing layer in respect to the base. This induces a strong beating effect. An observer moving perpendicularly to the cylindrical lenses of the revealing layer sees the same beating effect as when tilting the device vertically around the horizontal axis. The beating effect is produced by having, when tilting the device back and forth, at each position an evolution of the gray levels, from bright to dark and from dark to bright. Nevertheless, despite the beating, the contrast present at the different locations remains, see for example in FIG. 2, the contrast around the eyes remains present at the different tilt angles 211, 212 and 213. Therefore, at the different tilt angles, the overall moiré shape remains recognizable. The beating level-line moiré does not change the general aspect of the displayed moiré shape.

Figure 3A:
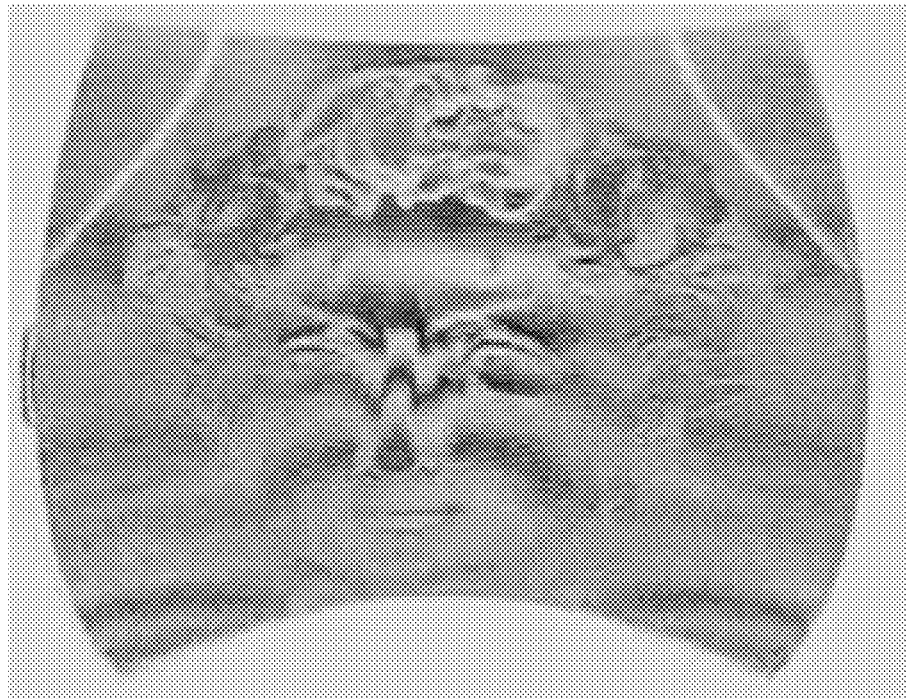
FIG. 3A shows a low quality level-line moiré.
Figure 3B:
FIG. 3B shows a high quality level-line moiré.

A high-quality level-line moiré is easily recognizable by an observer due to its high-contrast smoothly evolving beating effects when viewed from different directions. On the other hand, a poor-quality moiré exhibits low-contrast, irregular waves upon tilting. The visual quality criterion is best understood by an example. FIG. 3A shows a low quality and FIG. 3B a high quality level-line surface moiré.

A grating of cylindrical lenses (FIG. 4A) reveals the moiré with a higher light efficiency compared with a black and transparent revealing layer grating. Recently, the use of planar gratings of cylindrical lenses for creating high-quality 1D moirés [Cadarso et al. 2013], [Walger et al. 2019] and level-line moirés [Walger et al. 2020] has been demonstrated. Here, we review the relevant equations of a lens system and derive the relationship between the lens parameters [Walger et al. 2020].

In a cylindrical lens (FIG. 4B), there is a relationship between the lens radius r, the lens pitch (or width) w and its sag-height h:

$$(r-h)^2 = r^2 (w/2)^2 \qquad (8)$$

The focal length $f_l$ is given by [Hecht 1975]:

$$f_l = \frac{\eta_l}{\eta_l - \eta_{air}} r \qquad (9)$$

where and $\eta_l$ and $\eta_{air}$ are the indices of refraction of the lens material and of the air, respectively. For many polymers, including our materials, we can assume a refractive index of 1.5, thus $f_l=3r$. For the synthesis of a revealing layer, once the lens pitch w has been set equal to the base layer band repetition period, the only additional parameter that can be freely chosen within certain bounds is the lens curvature radius r. The curvature radius defines the angular field of view. The sag-height h enables obtaining the center of the lens arc surface, useful for creating the mesh that is used for fabrication. The sag-height is obtained from Eq. (8):

$$h = r - \sqrt{r^2 - \left(\frac{w}{2}\right)^2} \qquad (10)$$

In contrast to moirés on curved surfaces, only a single cylindrical lens pitch is present on level-line moirés laid out on a planar surface.

3D Extension of the Lens-Based Level-Line Moiré

Figure 4A:
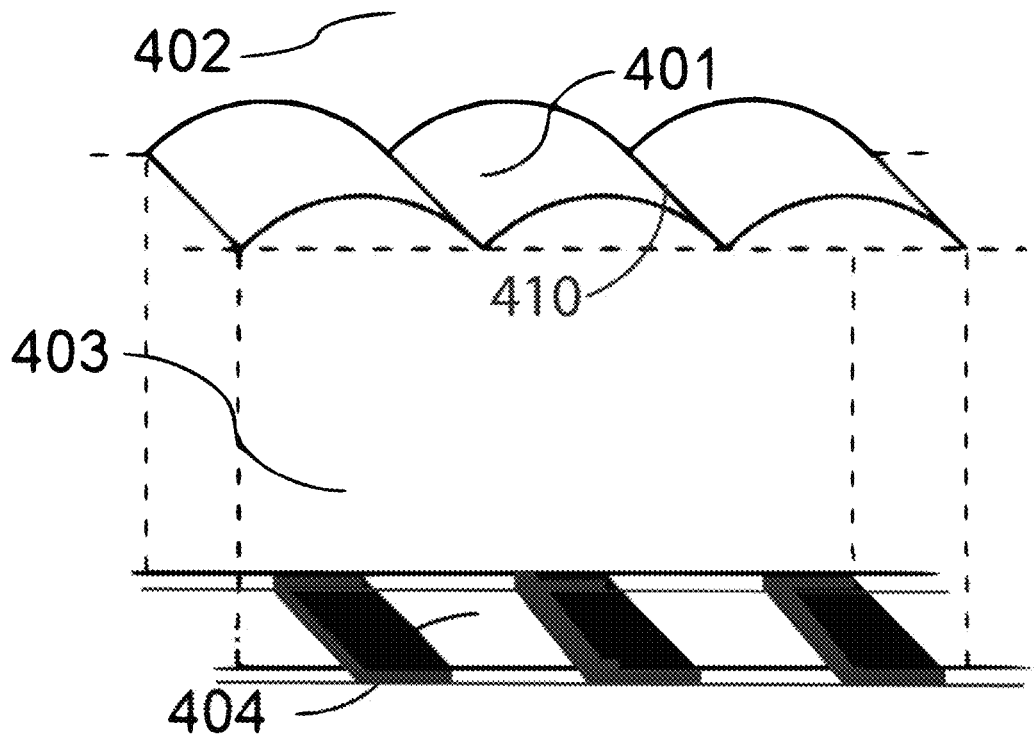
FIG. 4A shows a grating of cylindrical lenses on top of a base layer; where 401 is the lens arc surface, 403 is the lens body, 404 is the base layer, 402 is the air and 410 is the line (pitch line) at the intersection between neighboring cylindrical lens arc surfaces.
Figure 4B:
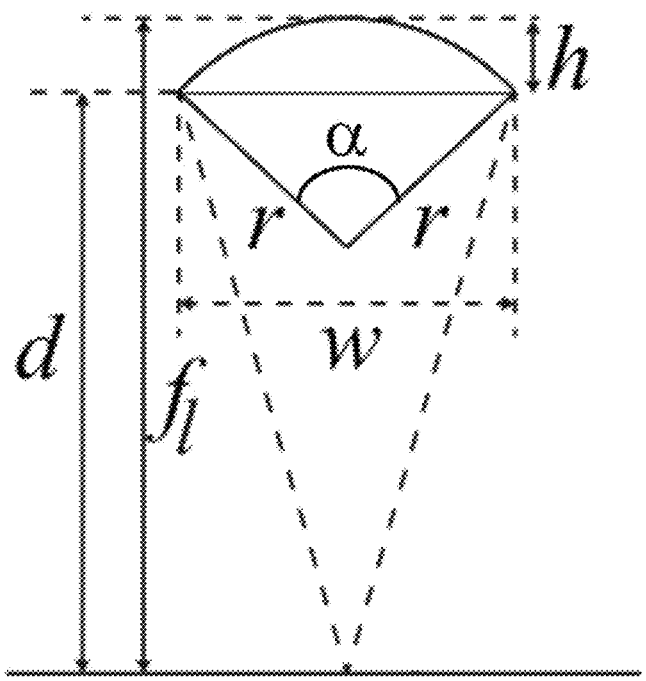
FIG. 4B shows a cross section of a single cylindrical lens with lens radius r, lens pitch (or width) w, sag-height h, focal length $f_l$, and lens body thickness d.
Figure 5A:
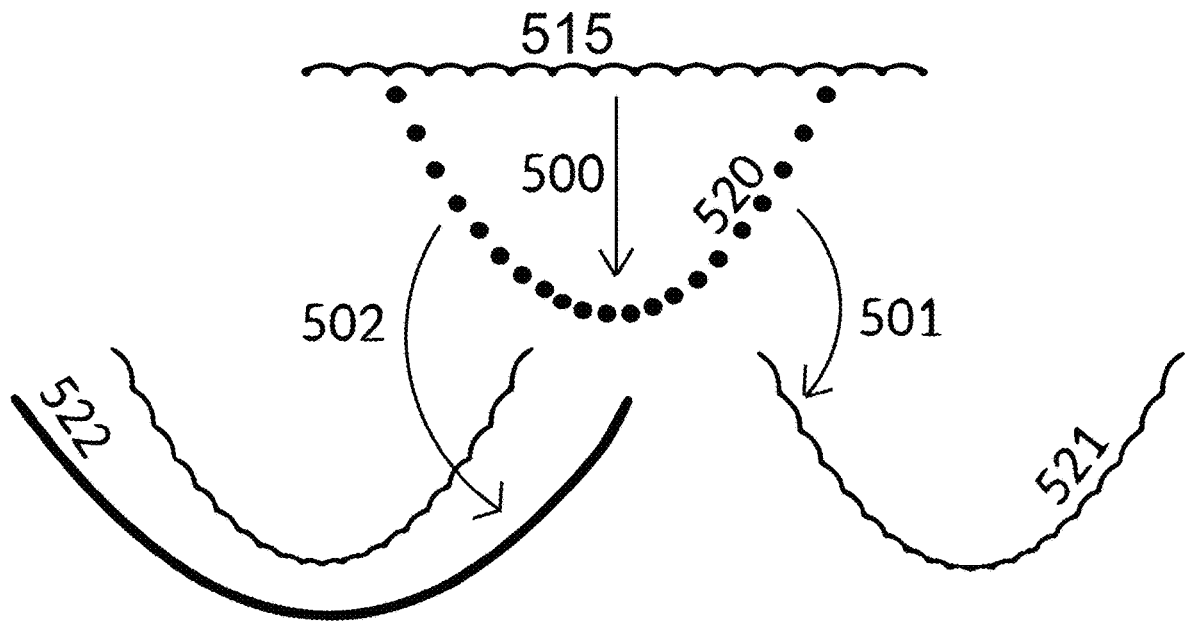
FIG. 5A shows the three steps 500, 501 and 502 in creating the moiré on a curved surface, where 520 is the lens pitch surface, 521 is the lens surface and 522 is the base surface.

The input to our curved surface moiré device creation method is a 2D planar base layer with base bands shifted according to an elevation profile of a source image and a curved surface. We focus our attention on parametric surfaces or surface parts in 3D, such as paraboloids, saddle surfaces, conic surfaces or ellipsoids. For 3D surface moirés, we call the virtual surface that goes through the intersection points of the lens arcs the lens pitch surface (FIG. 5A, 520) or simply the pitch surface. The intersection lines of the lens arc surface parts are called pitch lines (FIG. 4A, 410). We call the surface of the cylindrical lenses, i.e. the top interface of the moiré device with air, the lens-arc surface or simply lens surface. Finally, the base-layer surface or base surface is the moiré base-layer in 3D. Our proposed surface moiré design creation takes three steps:

1. Constructing the lens-pitch surface (520 in FIG. 5A) by mapping the planar lens-pitch $w_s$ to the desired surface (action 500 in FIG. 5A). This planar lens pitch defines the repetition period of the planar grating of cylindrical lenses.
2. Constructing the lens-arc surface 521 by fitting cylindrical lenses having circular sections to the lens-pitch samples (action 501).
3. Constructing the base-layer surface 522 from the lens-pitch surface (action 502).

In the following description, we explain each step in more details.

(a) Lens-Pitch Surface

In the first step of creating the surface moiré, assuming that the input surface is parametric, the lens-pitch surface P is described by $$P: f(u,v) \qquad (11)$$

where $f(u, v)$ is a vector function mapping 2D planar positions (u,v) onto (x,y,z) locations in 3D space.

When mapping the equidistant samples of the planar lens-pitch from the parameter domain (u, v) into the lens-pitch surface, distortions are introduced to the formerly equal pitch sizes, resulting in lenses with different pitches and different focal lengths. It is well known from differential geometry that an isometric parameterization exists only for developable surfaces. Therefore, this distortion is in the general case unavoidable.

(b) Lens-Arc Surface

Having computed the spatially-varying lens widths (also called pitches), determined by the points on the pitch lines of the lens-pitch surface, the next step is to fit the lens-arc surface to this underlying grid. For each individual lens pitch w from the previous step, there is still one degree of freedom: the lens radius r. At the first glance, one can use this degree of freedom to fit equi-radius arcs to the spatially-varying widths (511 in FIG. 5B). This has the desirable effect of making the focal length of all lenses equal. The downside, however, is that this leads to lenses with a wide range of angular fields of view that degrade the quality of the resulting moiré.

Figure 5B:
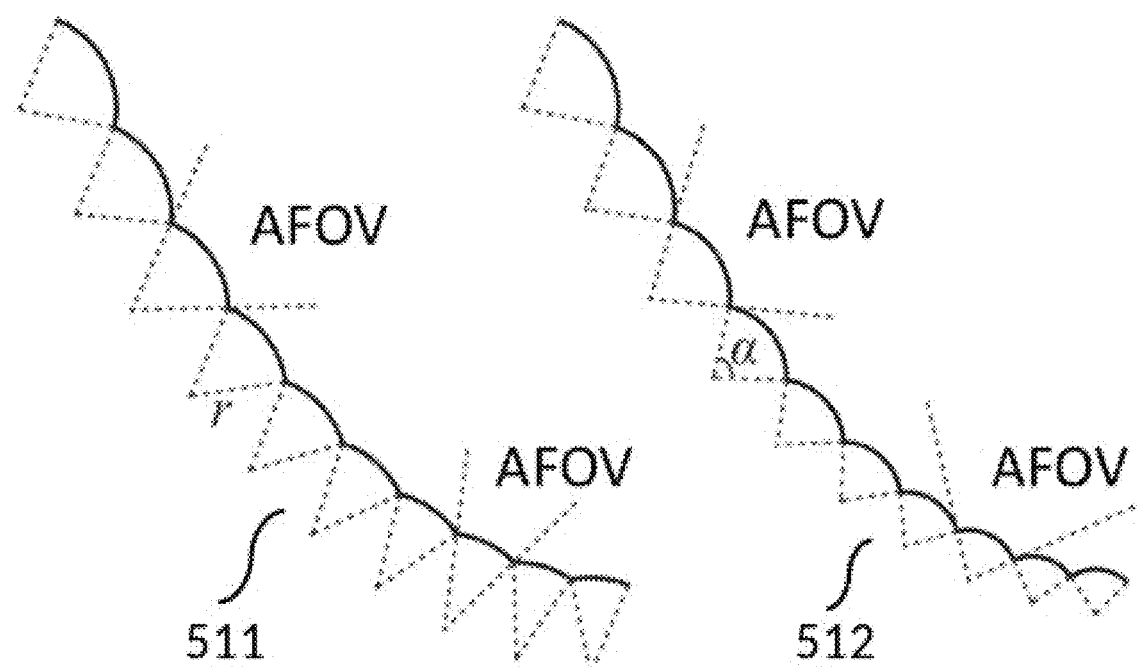

We use instead this degree of freedom to fit arcs with radii that generate lenses having at the different locations a constant angular field of view (AFOV or a), (512 in FIG. 5B). Eq. (12) gives the lens radius as a function of the desired field of view and of the current lens width w. For a fixed angular field of view a, Eq. (12) shows that the lens radius r is proportional to the lens width w. The focal length $f_l$ is therefore also proportional to the lens width w. According to FIG. 4B, we obtain $$\sin(\alpha/2) = \frac{w}{2 \cdot r} \Rightarrow r = \frac{w}{2 \cdot \sin(\alpha/2)} \qquad (12)$$

(c) Base-Layer Surface

Having synthesized the lens-arc surface, the next step for creating the surface moiré is to create the base-layer surface. The main challenge is that the inevitable distortions in the lens-pitch surface have an effect on the lens-surface, resulting in spatially-varying lens radii. A careful look at designing flat lenticular (cylindrical) prints [Tompkin et al. 2013] reveals a similar challenge: how to adjust the lenses to the spatial frequency of their base? They adapt the focal length of each lens to its radius while keeping the base-layer facets perfectly parallel to the planar lens-pitch layer facets. Although the curved lens-pitch surface of curved surface moirés differs from the flat lens-pitch surface of planar lenticular prints, the problem is similar.

Figure 6A:
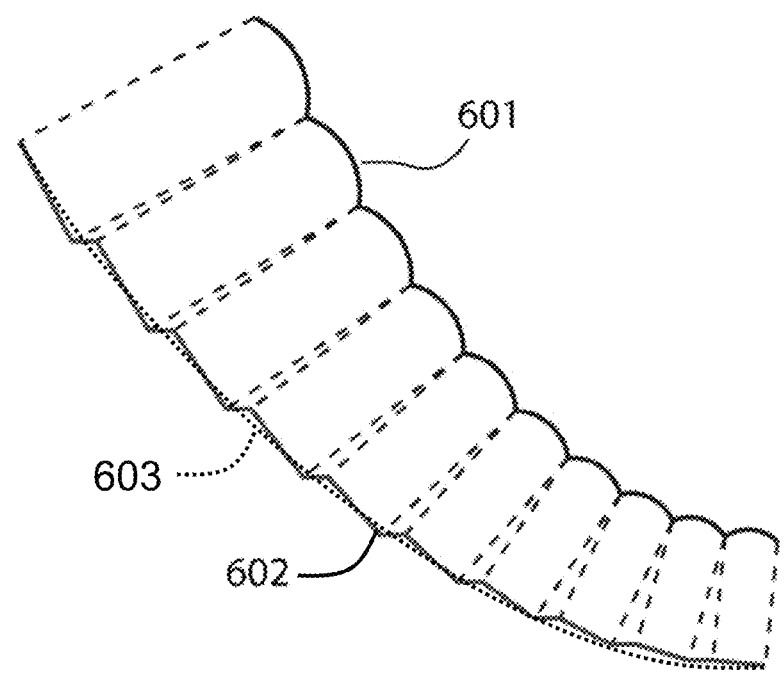
FIG. 6A shows a cross section of prior art lenses 601 [Tompkin et al. 2013] laid out onto a curved surface, with a discontinuous base layer surface (602, continuous line) as well as an approximation surface through the discontinuities (603 dotted line)
Figure 6B:
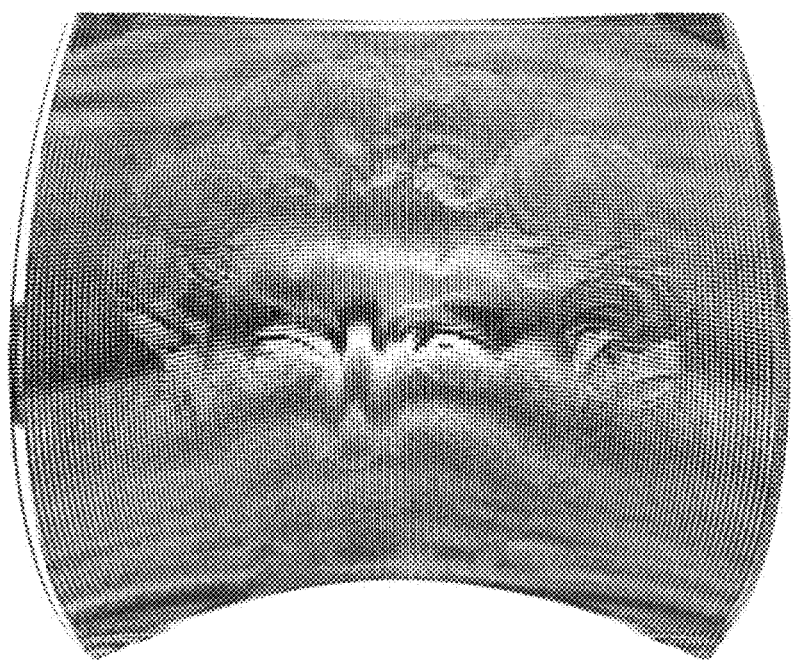
FIG. 6B shows a simulation of the produced moiré with of the prior art lenses shown in FIG. 6A, where the non-smooth base layer surface causes artifacts and degrades the moiré quality.

As a first approach, we compute the base-layer surface from the lens surface in the same manner as in the case of adaptive lenticular prints [Tompkin et al. 2013], by placing the surface patches parallel to the corresponding lens-pitch elements at a distance (spatially dependent offset) corresponding to their focal length. A typical cross section of the resulting construction is shown in FIG. 6A, in this case for a saddle surface. Each lens 601 has its corresponding base layer patch (602, continuous line) at the focal distance from the lens top. The rendered simulation of the resulting lens-based moiré is shown in FIG. 6B.

Despite having each individual lens focusing on a parallel surface segment, the base layer appears as a set of discontinuously connected patches that induces aliasing-like artifacts in the form of undesired moiré noise. One straightforward solution to avoid the discontinuities in the layout of the base layer surface consists in fitting a smooth approximation surface to the grid of points located at offsets from the lens pitch surface proportional to the focal distances. In addition, to account for the obliqueness of the light rays emerging from the moiré device and reaching the eye, the local offset between base layer surface and pitch surface may be a fraction of the local focal length, between. ⅓ and 1 time the focal length.

In the next section, we put forward a further solution for designing optimal, smooth base layer surfaces.

Base-Layer Surface Design

Figure 6C:
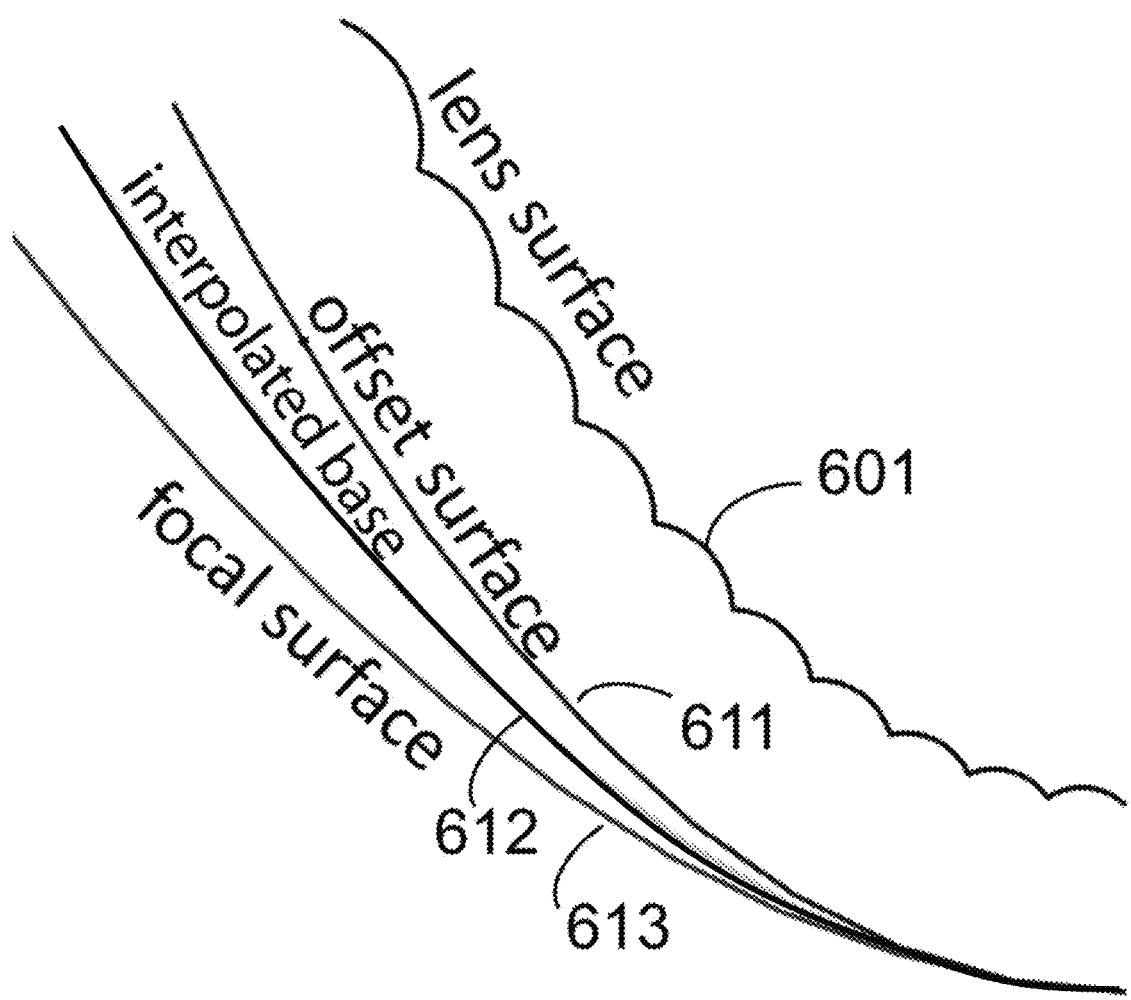
FIG. 6C shows a cross section of the lens surface 601, the offset surface 611, the focal surface 613 and one of the interpolated candidate base surfaces 612 for a given lens surface.

Our insight in designing surface moiré is the following. The optimal base-layer surface must be parallel to the lens surface and stay in focus while avoiding discrete jumps. However, parallellity and variable focality, for most continuous surfaces, are conflicting objectives (FIG. 6C). A notable exception is the plane where the base layer is both parallel and perfectly in focus, explaining the high quality of the planar moiré. Thus, for a given lens surface, we propose to compute its corresponding focal surface 613, i.e. the surface that is smoothly in focus as well as its offset surface(s) 611, i.e. surfaces whose elements are parallel to the corresponding lens-pitch surface elements. We expect the optimal base-layer surface to lay in between these two surfaces. Therefore, we introduce a formulation that embeds the optimal base surface in a low dimensional design space thereby enabling its rapid exploration.

Offset Surface

Given our lens-pitch surface P (Eq. (11)), the offset surface Q of P is defined as a surface whose points are at a distance d from their corresponding points on P $$Q: m(u,v;d) = f(u,v) - d \cdot n_f(u,v) \quad (13)$$

where the parameter d implies that Q is not unique, and $n_f(u,v)$ is the unit surface normal vector of P defined as $$n_f = \frac{f_u \times f_v}{\|f_u \times f_v\|}. \quad (14)$$

where $f_u = \frac{\partial f}{\partial u}$ and $f_v = \frac{\partial f}{\partial v}$ are the partial derivatives of $f(u,v)$.

Note that all functions described here are vector functions of the type (x,y,z)=h(u,v), where (u,v) are the coordinates in the planar parameter space and (x,y,z) are the coordinates in the 3-dimensional space within which the curved surfaces are laid out.

Focal Surface

For a given lens surface, its corresponding focal surface is a smooth surface continuously in focus. We compute the focal surface as a smooth approximation surface through the grid of focals from the lens-arc surface. Due to the distortion induced by the mapping function $f(u,v)$, the lens curvature radius changes along the surface. Once that the angular field of view (AFOV) has been fixed in the lens-arc surface construction stage, both the standard pitch $w_s$ and its corresponding radius $r_s$ are distorted by the same factor. According to the properties of the cylindrical lenses (FIG. 4B and Eq. (9)), and the fact that $w/w_s = r/r_s$, the focal surface R is formulated as:

$$R: h(u,v) = f(u,v) - n_f(u,v) \frac{\eta_l}{\eta_l - \eta_{air}} r_s \cdot \frac{w}{w_s} \quad (15)$$

The spatially dependent lens width (or lens pitch) w(x,y) can be obtained by taking two corresponding points on neighboring planar pitch lines, mapping these points onto the 3D pitch surface and calculating their distance. Equation (12) states that the radius of every lens on the lens surface is distorted from the planar surface radius $r_s$ by the factor $w/w_s$.

Let us calculate the parametric distortion $w/w_s = |f_u|$. We are interested in calculating how a 1D segment in the parameter domain (akin to $w_s$) would deform when mapped to a curve on a surface $f(u,v)$, creating a corresponding segment w. The ratio $w/w_s$ is the same as the ratio of the lens radius r on the curved surface to its radius $r_s$ on the planar surface. Therefore, it gives us the varying radius along the surface and consequently the focal distance for any point on the curved surface $f$.

Figure 19:
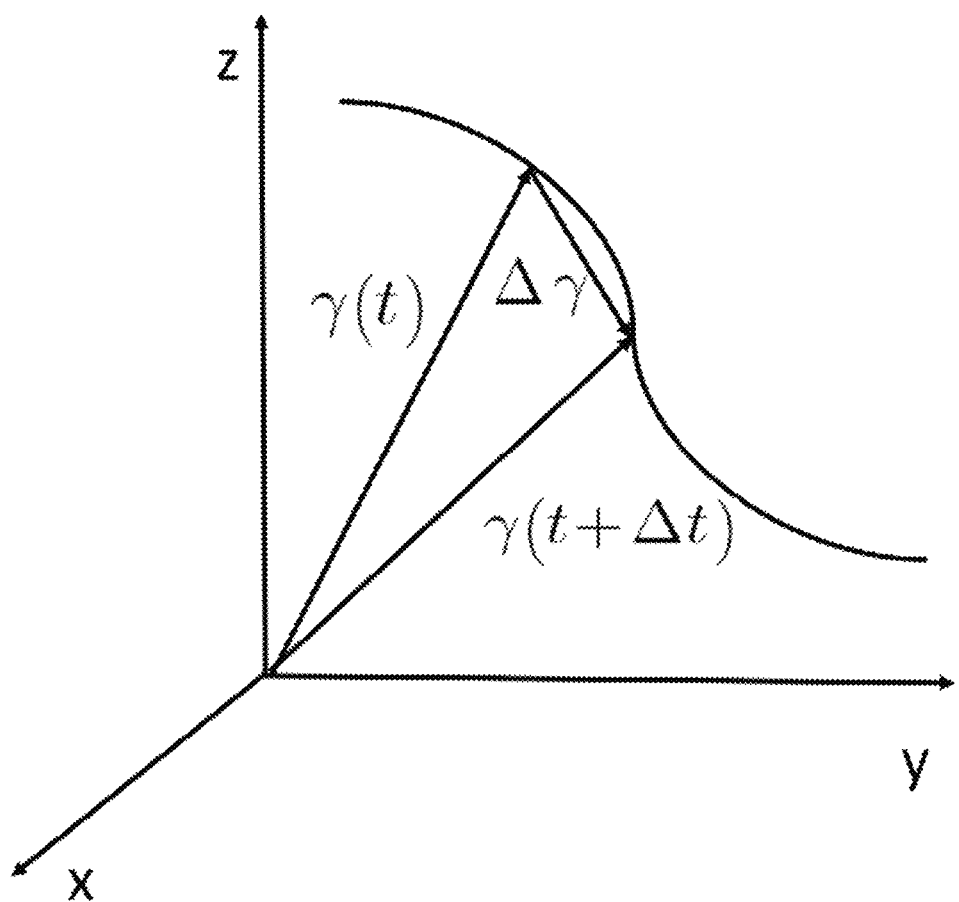
FIG. 19 shows a parameterized curve γ(t) in three dimensional space.

In a general setting, let us assume the lens pitch is mapped from a curve (u(t), v(t)) in the parametric domain to the parametric curve $\gamma(t) = f(u(t), v(t))$ on the surface $f(u,v)$ (FIG. 19). We first approximate the segment length $\Delta s$ with chord length $|\Delta \gamma| = |\gamma(t+\Delta t) - \gamma(t)|$ using a Taylor expansion:

$$\Delta s \approx |\Delta \gamma| = |\gamma(t+\Delta t) - \gamma(t)| = \left| \frac{d\gamma}{dt} \Delta t + \frac{1}{2} \frac{d^2\gamma}{dt^2} (\Delta t)^2 \right| \approx \left| \frac{d\gamma}{dt} \right| \Delta t \quad (16)$$

In an infinitesimal setting where $\Delta t \to 0$, the segment length $\Delta s$ becomes a line element:

$$ds = \left| \frac{d\gamma}{dt} \right| dt = |\dot\gamma| dt = \sqrt{\dot\gamma \cdot \dot\gamma} \, dt. \quad (17)$$

As $\gamma(t) = f(u(t), v(t))$, we have:

$$\begin{aligned} ds &= \left| \frac{d\gamma}{dt} \right| dt \\ &= \left| f_u \frac{du}{dt} + f_v \frac{dv}{dt} \right| dt \\ &= \sqrt{(f_u \dot u + f_v \dot v) \cdot (f_u \dot u + f_v \dot v)} \, dt \\ &= \sqrt{f_u \cdot f_u \cdot \dot u \cdot \dot u + 2 f_u \cdot f_v \cdot \dot u \cdot \dot v + f_v \cdot f_v \cdot \dot v \cdot \dot v} \, dt \end{aligned} \quad (18)$$

Recall that we are interested in calculating the ratio $$\frac{w}{w_s},$$

which is the 1D distortion and corresponds to the line elements ds and du, respectively in the continuous setting. In other words, $$\left| \frac{ds}{du} \right|$$

estimates $$\frac{w}{w_s}$$

when the lens widths are infinitesimal. Parameter v is not concerned as our lenses in the planar case are unidirectional, e.g., v(t)=C (C being a constant). Thus, the ratio $$\left|\frac{ds}{du}\right|$$

will give us the distortion at each point on the curve γ(t). Hence, given v̇(t)=0, Eq. (18) can be rewritten as:

$$ds = \sqrt{f_u \cdot f_u \cdot \dot{u} \cdot \dot{u} + 0 + 0}\, dt = |f_u| du \Rightarrow \left|\frac{ds}{du}\right| = |f_u| \quad (19)$$

Interpolated Base Surface

We explore the space between the offset surfaces Q and the focal surface R using a bi-linear interpolation in order to find the base surface S with the most visible moiré effect. Given that the focal surface is uniquely defined, the design space is made of two free parameters, the relative weight a between offset surface m(u,v) and focal surface h(u,v) as well as the offset d. We have therefore $$S: s(u,v;a,d) = (1-a)m(u,v;d) + ah(u,v) \quad (20)$$

The most important implication of Eq. (20) is that the base layer's design space has only two dimensions. The user can walk this space and find the two parameters that create the most satisfying moiré effect. According to FIG. 7, the moiré with the base surface identical with the offset surface (i.e. a=0) is superior to the other moirés, for offsets d=2$r_s$ and d=$r_s$. This seems mainly due to the fact that on a curved surface, the largest part of the moiré is viewed obliquely in respect to the surface normal. According to Eq. (9), a focal distance resulting from an offset smaller than 3$r_s$ means that at a normal view the moiré is to some extent out of focus and at an oblique view the moiré comes closer of being into focus, i.e. it becomes sharper.

Dual-Lens Surface Moiré

An interesting variant of the level-line moiré consists in using an array of cylindrical lenses also for the base layer, see U.S. Pat. No. 10,286,716 and [Walger & Brugger 2020]. The resulting "dual-lens" device combining the two layers of cylindrical lenses has a number of advantages. There is only little light attenuation by the base. The moiré that can be seen in transmission mode shows level lines having the colors of the incident light rays, for example blue light from the sky or green light from the trees. In addition, the device can be 3D printed with a single material. It can also be manufactured by casting, i.e. by pouring a single clear liquid material into a mold, by allowing the material to solidify and by removing the mold. For casting purposes, the shape of the mold is the negative of the shape of the moiré device.

Figure 8A:
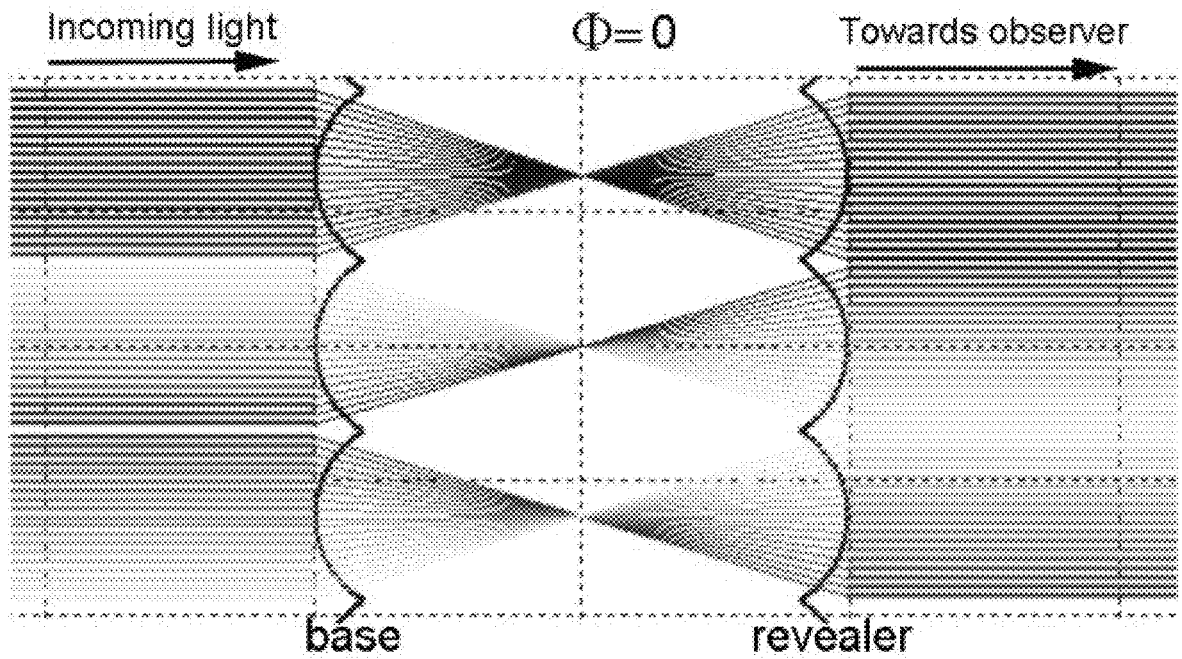
FIG. 8A shows a cross-section of a transparent dual-lens device formed by two gratings of transparent cylindrical lenses with light rays oriented towards the eye of an observer crossing an unshifted base.
Figure 8B:
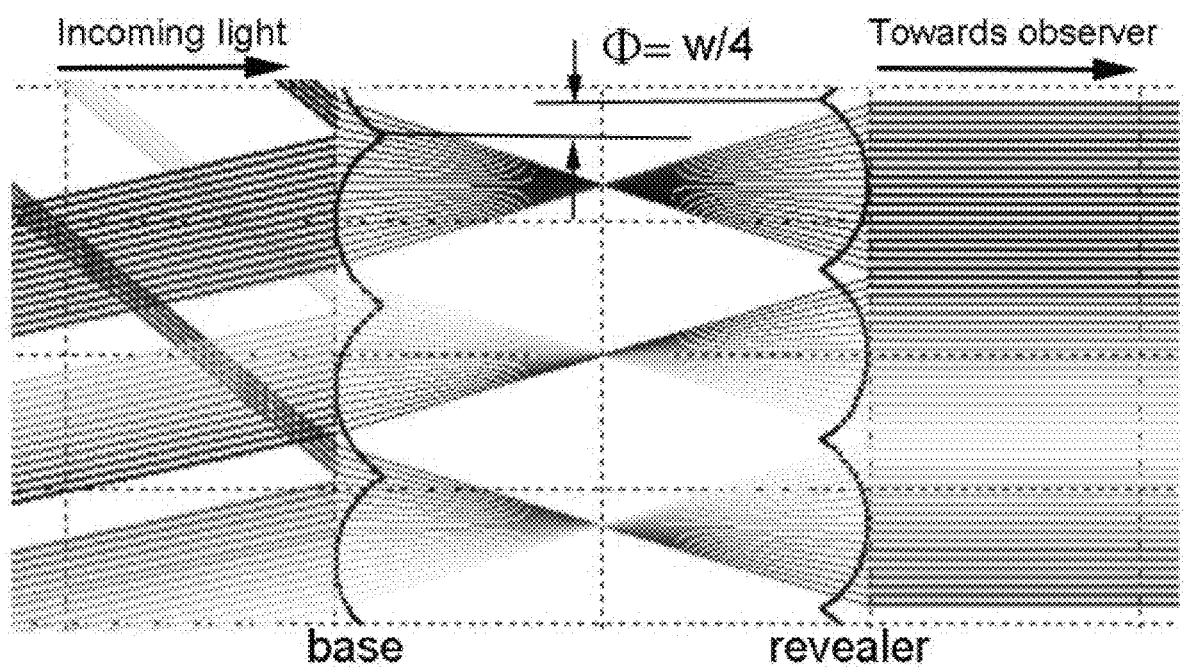
FIG. 8B shows a cross-section of a transparent dual-lens device formed by two gratings of transparent cylindrical lenses with light rays oriented towards the eye of an observer crossing a base shifted by quarter of the lens repetition period (schematic view)
Figure 9:
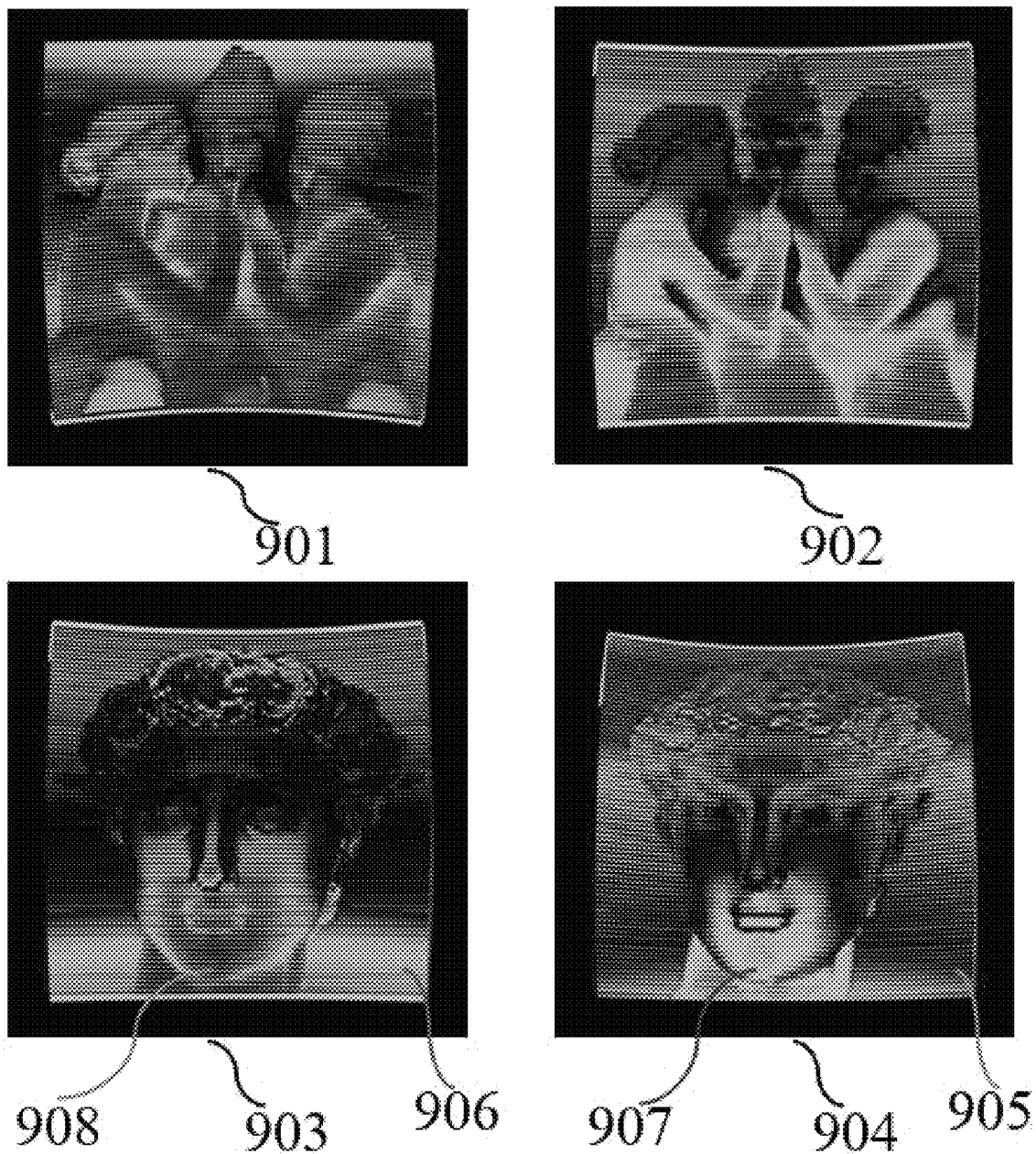
FIG. 9 show simulations of dual-lens level-line surface moirés on saddle surfaces, where 906 and 905 indicate different phases of the surface level-line moiré at a single position due to tilting and where 908 and 907 indicate the beating effect on David's chin when tilting the device.
Figure 10:
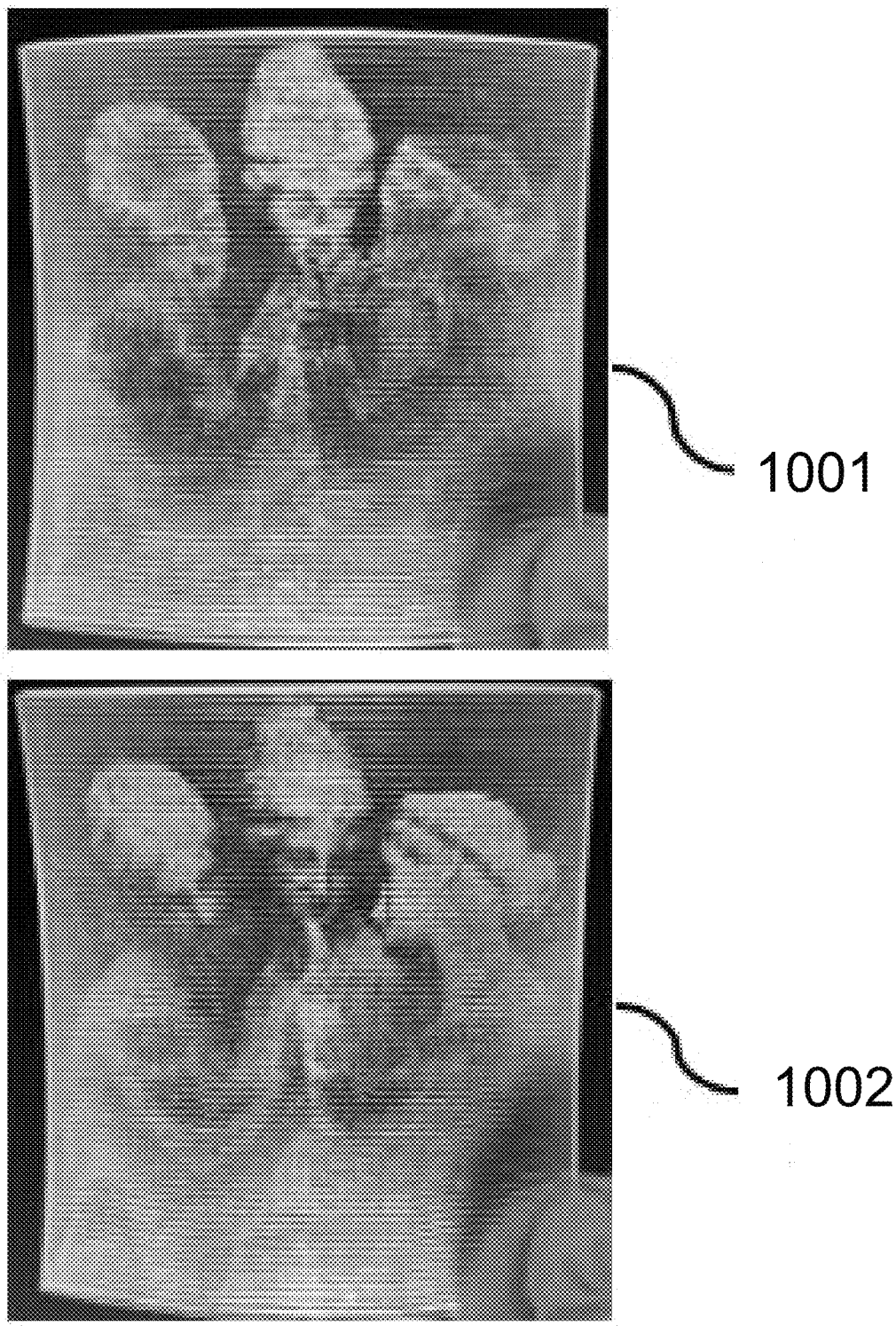
FIG. 10 shows photographs 1001 and 1002 of a printed dual-lens level-line surface moiré on a saddle surface, observed from two different viewing angles.
Figure 11:
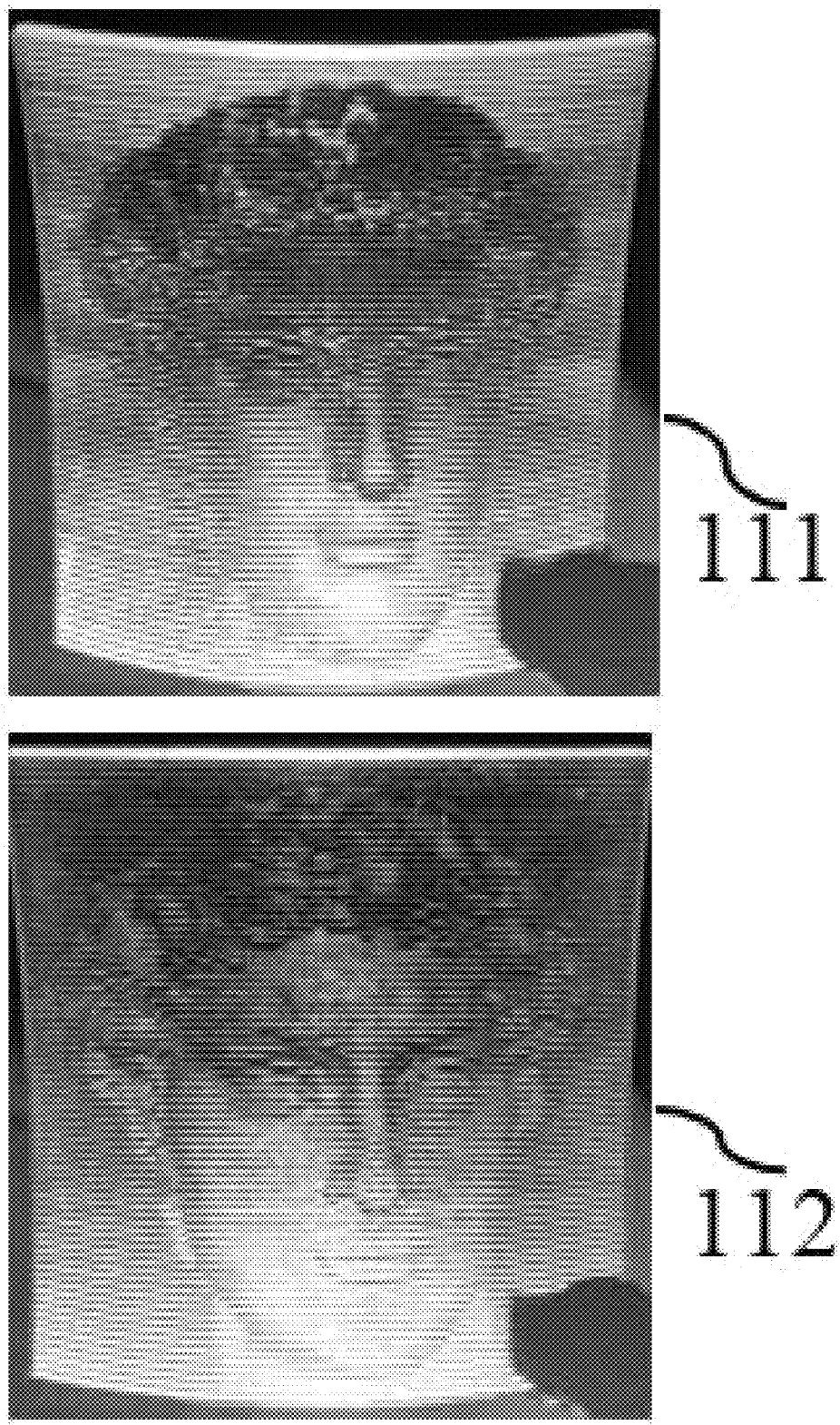
Figure 12:
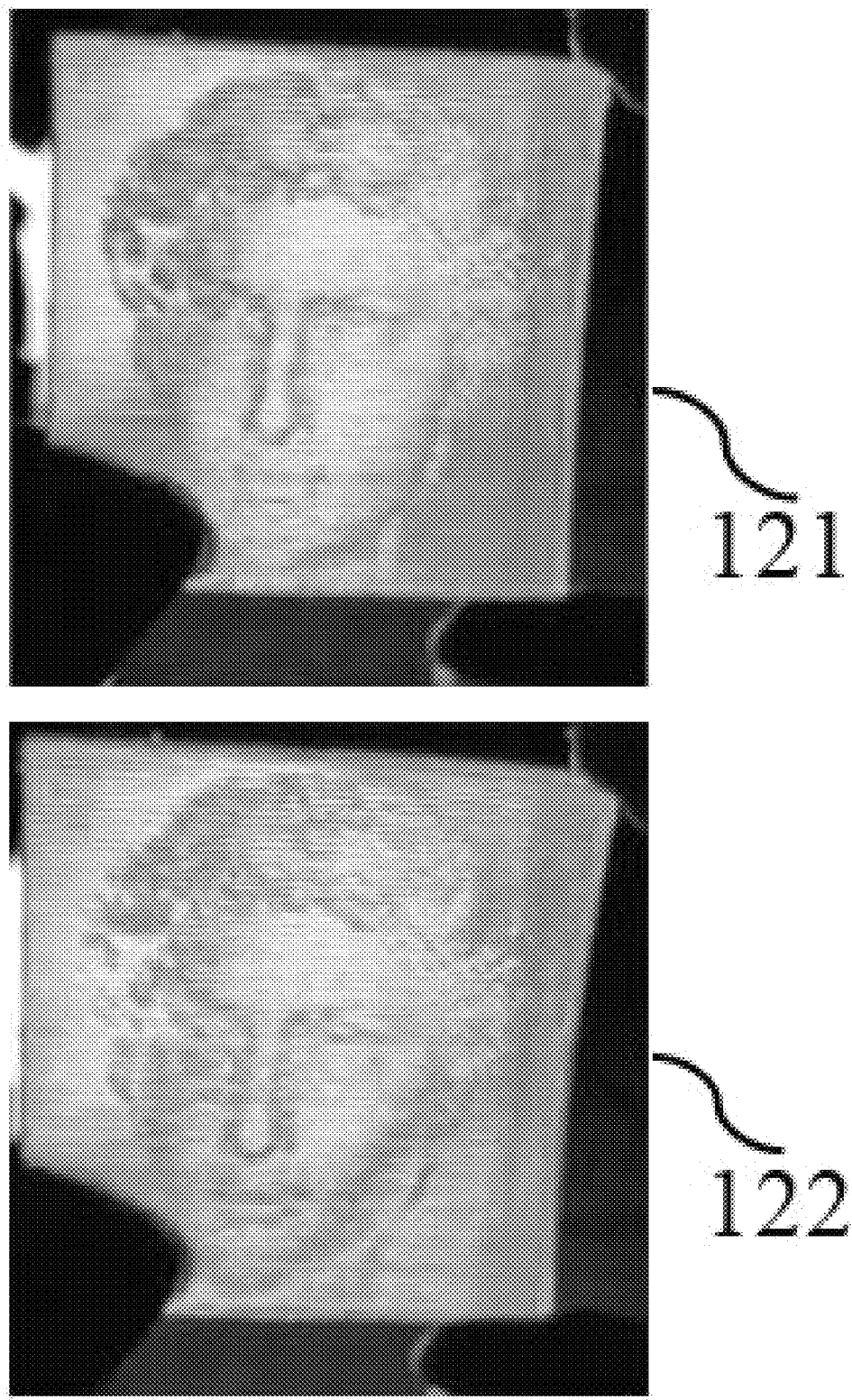

Let us consider a base formed by a grating of cylindrical lenses. For the base, the trajectories of the center lines of the cylindrical lenses are shifted perpendicularly to the orientation of their unshifted trajectory in proportion to the elevation profile. The shift of the base cylindrical lens grating in respect to the revealing layer grating of cylindrical lenses has the effect of directing towards the observer incoming light rays from a different orientation (FIG. 8A and FIG. 8B). The change of orientation of the incoming light rays that pass through the device and reach the eye of the observer creates the level line moiré effect. Simulations of the dual lens surface moiré are shown in FIG. 9 and photographs of the fabricated dual-lens surface moirés are shown in FIG. 10, FIG. 11 and FIG. 12.

Simulation and Fabrication

In this section, we show as examples a variety of surface moirés both simulated and fabricated with different elevation profiles and different geometries. As we restrict ourselves to print with only two materials at the same time, we choose to use a transparent (clear) material for lenses and a black material for the absorbing parts of the base layer halftone. Therefore, the presented moiré devices are preferably transmission-based devices and should be illuminated from behind. However, they can also be observed in reflection mode on top of a bright reflecting surface. In addition, when the dark material of the absorbing parts of the base layer is replaced by reflective material, such as metallic particles, the level-line moiré appears strongly in reflectance mode and also appears in transmission mode.

Figure 7:
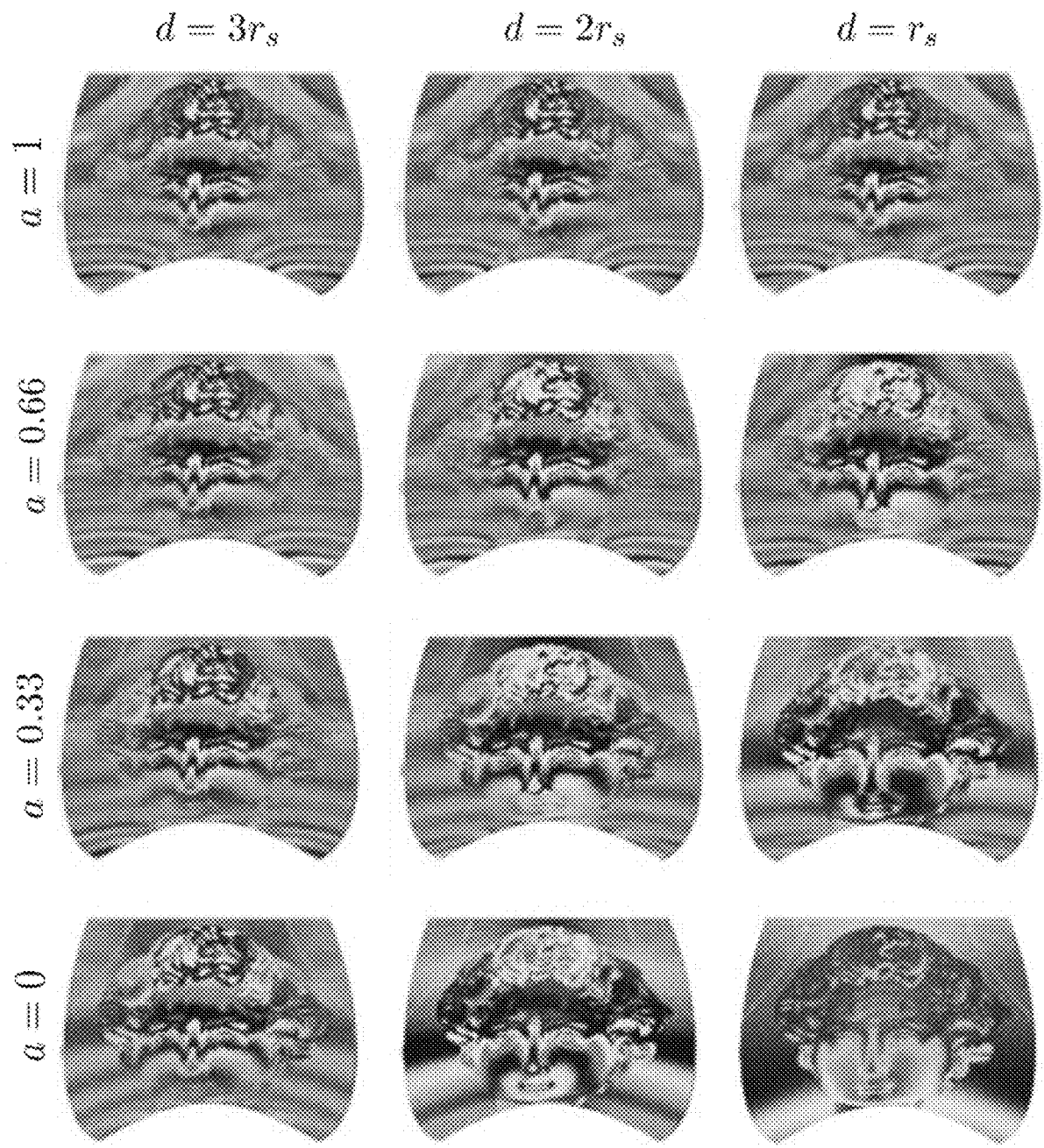
FIG. 7 shows the moiré design space explored by varying the weighting parameter a and the distance parameter d, according to Eq. (20)
Figure 13:
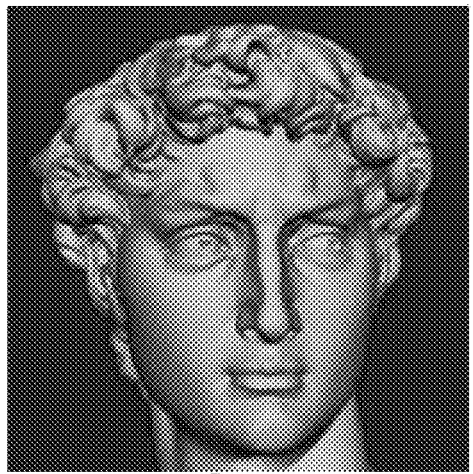
Figure 13:
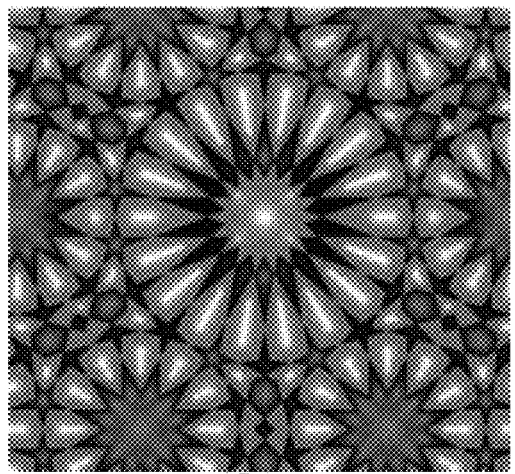
Figure 13:
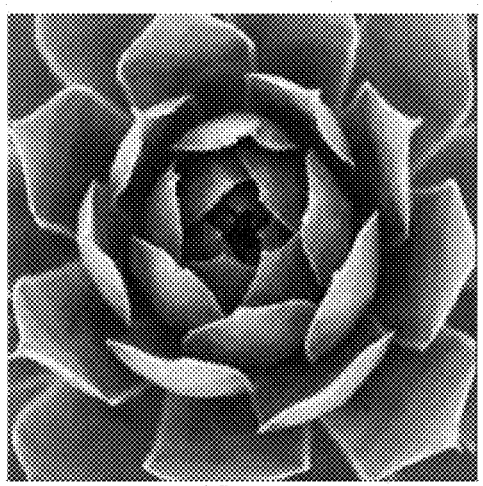
Figure 13:
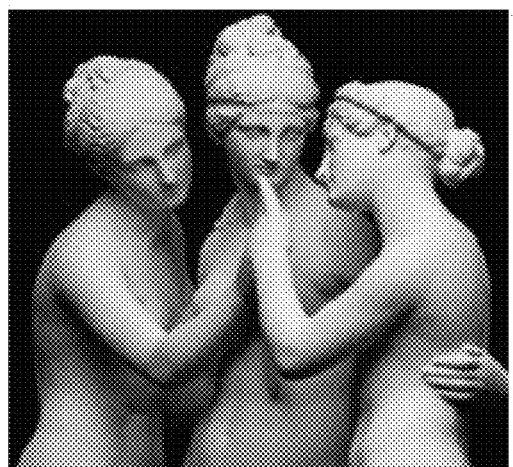

When previsualizing the simulated moirés obtained according to the different parameters, we found a values near 0 to give the best results (see FIG. 7). This highlights the fact that a parallel layout of lens and base surfaces is of high importance, as also hinted by [Walger et al. 2020]. FIG. 13 shows the different elevation profiles used in conceiving the level-line moiré devices incorporating the curved surface base layer superposed with the curved surface revealing layer made of cylindrical lenses. The corresponding mesh descriptions are used for fabricating the curved surface level-line moirés.

Simulations

We use Cycles, a physically-based rendering engine based on unidirectional path tracing [Blender 2019], for our simulations (128 samples, default settings). We use two default materials, close to our black and clear materials, namely the "Diffuse BSDF" with roughness 1 and refractive index 1.5 for the black material, and "Glass BSDF" with roughness 0 and refractive index 1.5 for the clear material. For rendering the multi-material moiré, the lighting of the scene is ambient light. For the dual-lens surface moiré, lateral area lights have been used.

FIG. 9 shows different simulations with various elevation profiles and tilt angles. As it can be seen in these figures, our designs create dynamically beating moiré shapes as well as highlight and dark areas that move along the surface when viewing the device from different angles.

When tilting the device, the moirés change their shape due to the fact that the angles of the rays from the eye to the cylindrical lenses change in respect to the lens normal. This modifies the sampling locations within the base layer and as a consequence modifies the displayed intensities or colors and possibly slightly shrink or enlarge parts of the level-line moiré shapes.

We don't notice additional undesirable moirés, indicating the usefulness of our framework that comprises constant field of view lens-arc surfaces and enables selecting the base surface by design space exploration.

Fabrication

The new additive fabrication technology enables many applications. The level-line moiré appearing on a curved surface can be fabricated and integrated onto an object having a curved surface, for example a bottle made of glass or plastic. In addition, curved level-line moiré devices can be attached to, pasted onto or integrated into valuable articles such as watches or watch armbands. This is useful both for decoration and for the prevention of counterfeits. Multi-material 3D printing is our primary fabrication platform for moiré surfaces. While the current additive technology is still mostly used for prototyping, there is also the possibility of mass manufacturing surface moiré devices using molding techniques.

(a) Multi-Material 3D Printing

The multi-material 3D printer used in the present project is an inkjet-based, phase-shift, photopolymer printer. We print all our samples in the glossy mode and align the lens's longer axis with the printing direction for a better lens profile reproduction. For achromatic moiré devices, one type of material is the clear material and the other type of material is the opaque and/or light absorbing material, such as plastic incorporating carbon particles.

FIG. 14, FIG. 15, FIG. 16 and FIG. 17 show photographs of the samples fabricated with our printer, with clear and light absorbing plastic materials. The movement and the width of the dark and highlight moiré bands are very well predicted in our simulation.

Figure 21:
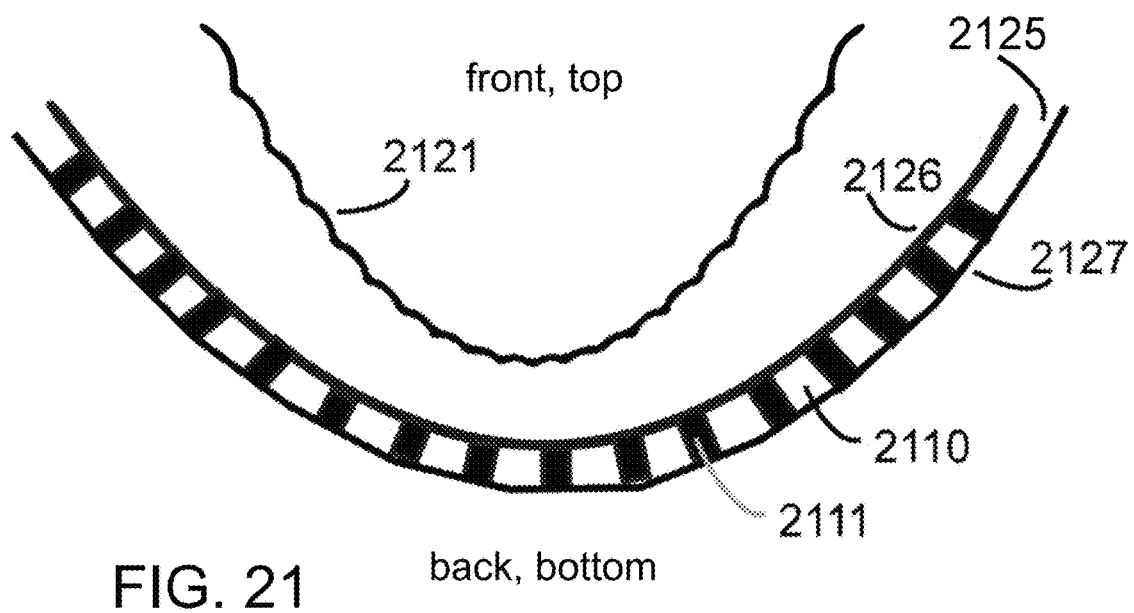
FIG. 21 shows schematically a horizontal cross-section through a saddle moiré device with the lens superior surface 2121, the base layer 2125 with its top interface 2126 (also called interpolation surface) and its bottom interface 2127 which forms the bottom of the moiré device.

The thickness of these samples is between 3 to 5 mm. The thickness of the revealing layer lens part located between surfaces 2121 and 2126 is between 3 and 4 mm (FIG. 21). The thickness of the base layer part located between surfaces 2126 and 2127 is between one millimeter and two millimeters. The chosen repetition period for the initially planar revealing layer grating of cylindrical lenses and for the base layer grating of base bands is 1 mm. Other repetition period can be selected, for example periods between ⅙ of a millimeter to 3 millimeters. The chosen repetition period should be adapted to both the thickness of the level-line moiré device and to its overall size. Depending on the light absorbing capabilities of the dark material, a thinner or thicker base layer is adequate.

(b) Spray Coating

A further possibility consists in creating first only the lens part of the moiré device (FIG. 21, top surface 2121, bottom surface 2126). Then one may create separately a base mask surface formed by a thin plastic layer with holes. The base mask surface is formed by base mask bands which are perpendicularly shifted in proportion to the selected elevation profile. This base mask layer has the same 3D shape as the lens bottom surface 2126. The holes have the L-shape or mirrored L-shape shown in FIG. 2, 203 or in FIG. 22A, 2230. Other shapes creating intensity gradients across the base layer bands, such as triangular shapes 2260 are also possible. The resulting curved surface mask is fixed onto the bottom surface 2126 of the revealing lens layer. Metallic particles are deposited by spray coating onto the masked bottom surface. The particles traversing the holes reach the bottom surface 2126. After removing the mask, the resulting opaque metallic L-shapes form the base layer. Instead of metal, particles containing for example colorants could be spray coated into the masked bottom surface.

(c) Molding

For designing the mold, we follow the steps proposed by [Babaei et al. 2017], and create the two-piece molds. We use the SYLGARD 184 Silicone Elastomer (Polydimethylsiloxane, named "PDMS") from Dow Chemicals, a very clear silicone whose flexibility can be controlled by the ratio of its two components. The high transmittance of the silicone leads to a very clear moiré, see FIG. 12. Its beatings are sharper, compared with the ones of its 3D printed counterpart (FIG. 10 and FIG. 11). The produced silicone level-line moiré device is flexible. Nice moiré deformations are obtained when pressing or twisting this moiré device.

Method Steps

Since the method for creating curves surface level-line moirés is carried out by a computer program, the corresponding data elements are placed in computer memory. Such data elements define the planar base and revealing layer gratings, the pitch surface, the offset surfaces, the focal surface, the lens surface, the interpolation surfaces, the resulting base layer surface and the meshes.

Let us review the steps that are to be carried out in order to create curved level-line moirés.

Figures 22A, 22B:
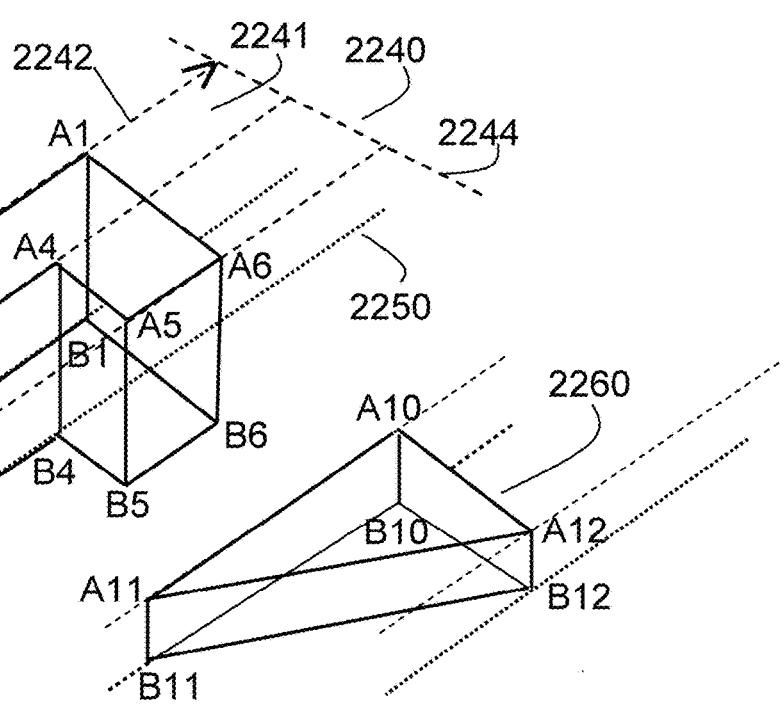
FIG. 22A shows an enlarged view of part of the moiré device base band 2240 with the top of the base layer 2241 and its bottom 2250, incorporating a 3D hole 2230 formed by the "L-shaped" volume defined by vertices A1 to A6 and B1 to B6, where the repetition period 2242 (or width) of the base band is between one band extremity 2244 and the other band extremity 2243.
FIG. 22B shows an enlarged view of a triangle hole shape 2260 as an alternative to the L-shaped volume of FIG. 22A.

1. Define the destination curved surface on which the moiré will appear (FIG. 20, 2001).
2. Start from a planar revealing layer grating of sampling lines (FIG. 5A, 515) embodied by cylindrical lenses or of transparent lines and (2002) project (FIG. 5A, 500) that planar grating onto the destination surface, called pitch surface (520).
3. Build the cylindrical lenses on the pitch surface (2003). This step creates the lens surface (521 in FIG. 5A).
4. Calculate the pitch surface normal and formulate the offset surface m(x,y), see FIG. 6C, 611 (2004). If the interpolation weight a=0, then the base layer surface is an offset surface. For an interpolation weight a>0, the focal surface 613 is computed and the base layer surface is interpolated according to Eq. (20). The good looking level-line moiré examples of FIG. 7 have been obtained with parameters a=0, d=$r_s$ or with parameters a=0, d=2 $r_s$. In case one would like to explore the curved moiré design space, create the interpolation surfaces between different offset surfaces and the focal surface by walking the degrees of freedom of the design space (e.g. interpolation surface 612 in FIG. 6C). According to Eq. (20), consider as degrees of freedom the offset d and the interpolation weight a. It is generally sufficient to explore this design space once for a given curved moiré surface. Select the set of parameters yielding the visually best level-line moiré for the final base layer surface. For the dual lens surface moiré, the base layer itself has a structure similar to the revealing layer lens surface, but the lenses are placed upside down. They are laid out normally to the base layer surface obtained in step 3 or 4.
5. According to Eq. (20), with each candidate set of interpolation weight a and offset d, calculate the corresponding base layer surface (2005).
6. Write the created structures into watertight meshes, for example in the STL format (2006). A set of meshes associated with a moiré device comprises preferably three meshes. The first is the lens mesh that comprises the description of the cylindrical lenses (FIG. 21, 2121), the lens bottom 2126 and the parts connecting the lens top 2121 and the lens bottom 2126. The second and the third are the two meshes of the base 2125, namely, the transparent base mesh defined at the top of the base 2126, at its bottom 2127 and the parts connecting top and bottom. The transparent base mesh incorporates L-shaped holes (FIG. 22A, A1 to A6, B1 to B6) that are filled by the opaque base mesh 2111. The opaque base mesh fills the holes with opaque and/or light absorbing material. FIG. 22A shows the base with its top layer 2241 (corresponds to 2126) and its bottom layer 2250 (corresponds to 2127). As shown in FIG. 22B, it is possible to replace the L-shape by other shapes creating a gradient through the base stripes, such as a triangular shape 2260. In the case of a dual-lens moiré device, a single mesh describes the curved surface formed by the revealer's cylindrical lenses, the base's cylindrical lenses and their connecting parts.

7. The meshes created with the selected parameters are simulated and visualized as moiré animations by simulating the tilting action (2007). The set of meshes providing the best simulated moiré effects is selected for fabrication.

8. For 3D printing, in order to obtain a single output print, we input at once the required meshes onto the computer driven multi-material 3D printer. For spray coating, the lens mesh and the base mask are printed separately on the 3D printer. For the dual lens surface moiré, there exists an additional fabrication method, named casting, where a mold is created with the negative of the designed mesh, by either 3D printing or by milling. Then the PDMS clear material is poured into that mold and solidified (2008).

Figure 20:
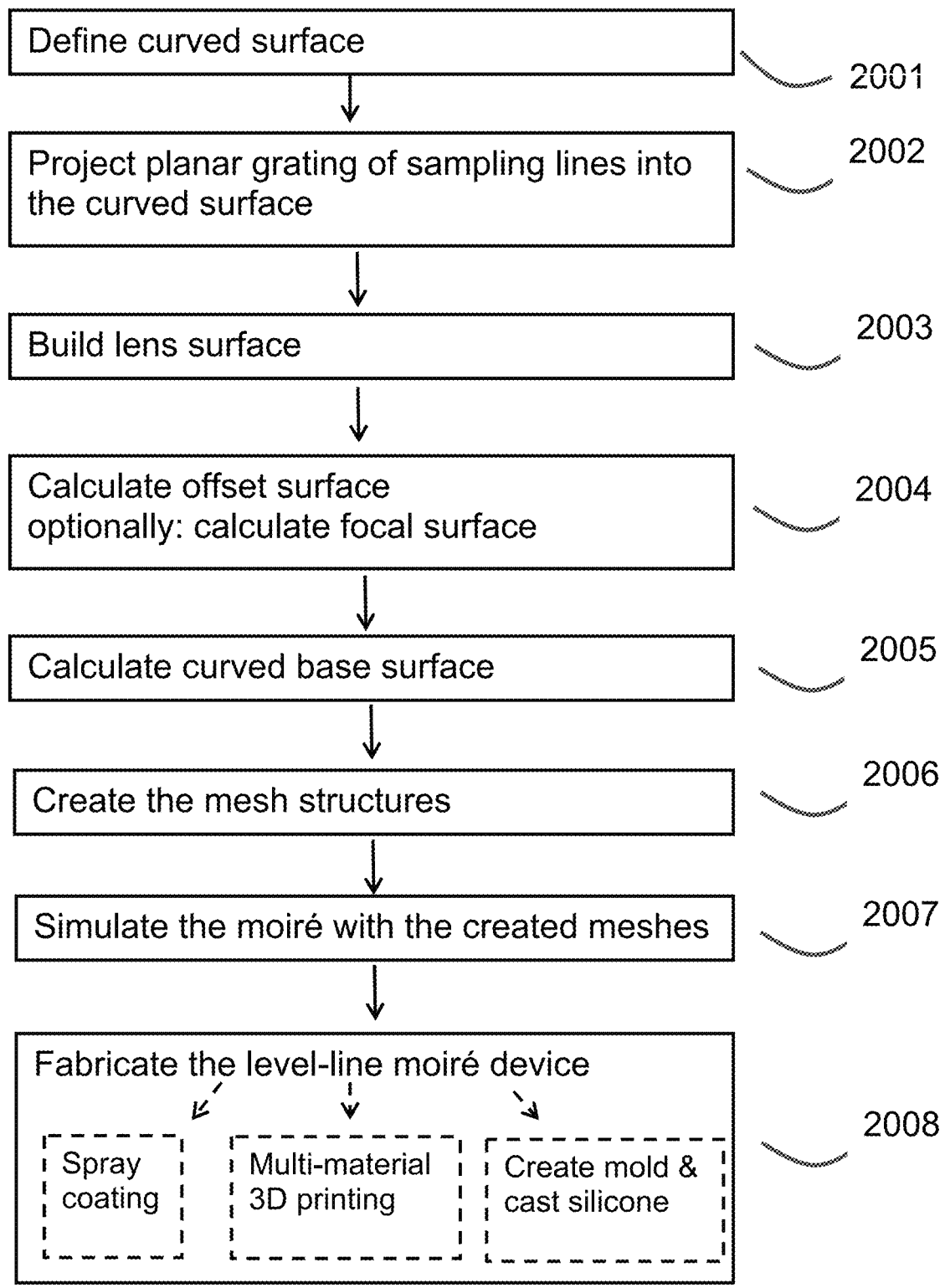
FIG. 20 shows a flow chart of the computation and fabrication steps in order to obtain the curved device with the desired level-line surface moiré.

FIG. 20 shows a flow chart of the steps that allow creating a moiré on a given curved surface. Note that not all steps are necessary, since it is possible to adopt a fixed set of parameters that are known to produce nice surface moirés, for example by specifying that the target base layer surface should be identical with the offset surface at a distance of $d=2r_s$.

Curved Level-Line Moiré Device with a Revealing Layer Grating of Transparent Lines FIG. 1 shows a planar level-line moiré device with a base layer grating of dark and white bands 102 and a revealing layer made of a grating of transparent lines 103. The level-line moiré 104 results from the superposition of base and revealing layer gratings. The curved level-line moiré device with the revealing layer grating of transparent lines is obtained in a similar manner as the device with the revealing layer grating of cylindrical lenses, but with the following differences.

(A) The planar level-line moiré is designed with a revealing layer grating of transparent lines, with the width of the transparent lines being ⅔ to ⅙ of the revealing layer grating repetition period, preferably ½ the repetition period. This revealing layer grating of transparent lines is the planar pitch surface.

(B) The pitch lines are the lines at successive transitions between the revealing layer transparent lines and the revealing layer dark lines.

(C) Since there are no cylindrical lenses, no lens radii are calculated.

(D) The curved pitch surface of the revealing layer is obtained by projecting the planar pitch surface with the straight pitch lines onto the curved surface $f(u,v)$.

(E) The base layer grating of shifted bands is laid out as a location dependent smooth offset surface distant from the curved pitch surface, with a local offset proportional to the pitch size, i.e. to the distance between neighboring curved pitch lines. The preferred proportionality factor for the offsets is between ¼ and 4 times the local pitch size. The location dependent offset surface is constructed by a smooth surface, similar to surface 603 that smoothly approximates the discontinuous surface 602 (FIG. 6).

(F) Since the revealing layer grating of transparent lines is formed by transparent lines and dark lines, there will be one set of meshes for the transparent part of the revealing layer and one set of meshes for the dark part of the revealing layer, in a similar manner as for the base layer grating of base bands (FIG. 4, 404).

Characterization of a Curved Surface Moiré Device

Figure 23:
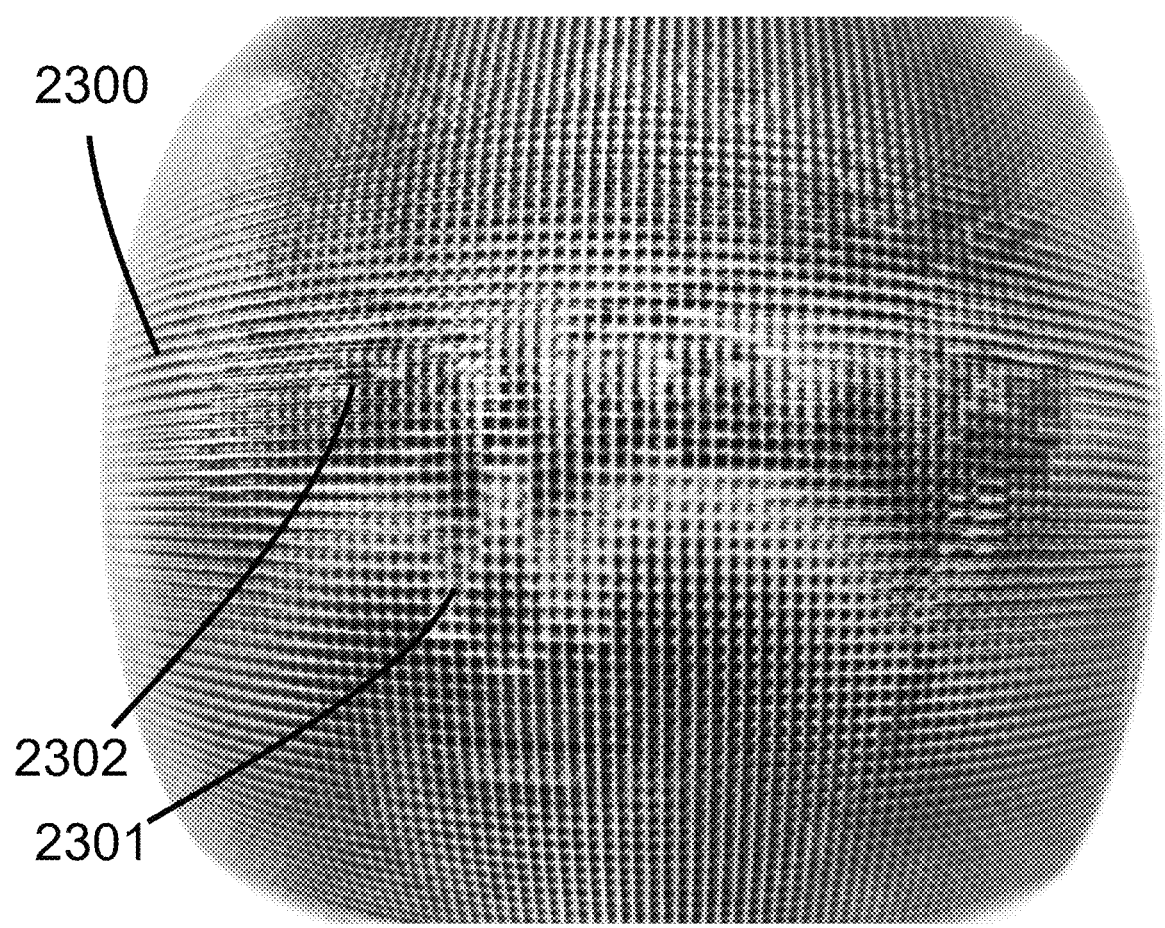
FIG. 23 shows a photograph from the front of a fabricated "David" level-line moiré laid out on a paraboloid surface.

In the case of a revealing layer grating embodied by cylindrical lenses, the cylindrical revealing layer lenses are like stripes lying one next to another on the surface, see FIG. 4A, lens layer 401. FIG. 23, 2300 shows the array of cylindrical lenses laid out horizontally along the paraboloid surface. They give the feeling of a rough surface when being touched with a finger moving on the surface perpendicularly to the lens stripes. In the case of a revealing layer grating embodied by of transparent lines, the top revealing layer surface is smooth.

Optically, when tilting the level-line moiré device (e.g. the one in FIG. 23), one observes large horizontal dark and bright waves moving vertically on the paraboloid surface, i.e. perpendicularly to the orientation of the revealer's cylindrical lenses. The bright portion of these waves enhances the contrast of parts of the moiré, for example at a certain tilt angle, the nose 2301 and the eye 2302. In the example of FIG. 23, there are two to three of such dark-bright waves across the paraboloid surface.

When looking at the device from a side view, one observes the thickness of the device which is determined by the thickness of the revealing layer grating (e.g. the lens layer, see FIG. 4A, lens body 403) plus the thickness of the base layer (FIG. 4A, base layer 404).

Figure 24:
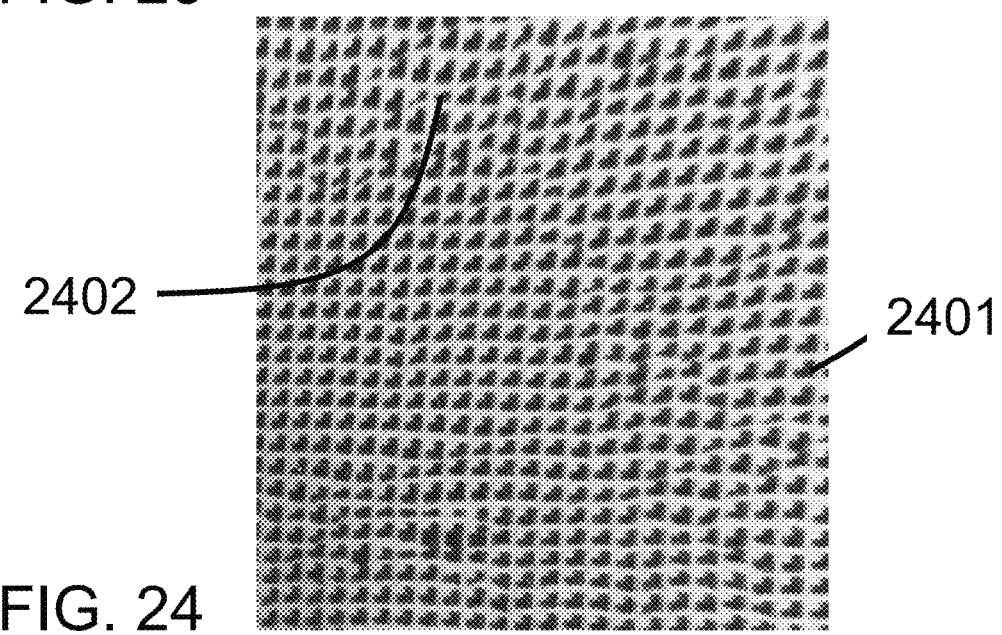
FIG. 24 shows an enlarged part of a photograph of the same device as in FIG. 23 taken from the back.

The base layer is visible from the backside of the curved surface device. It is characterized by the opaque patterns that cover its stripes (FIG. 2, inverse of 203). FIG. 24 shows an enlargement of part of a photograph taken from the back of the moiré paraboloid shown in FIG. 23. The horizontal stripes show vertical displacements, similar to the vertical displacements 2402 shown in the base layer design of FIG. 2, 203. In addition, they show the small repetitive vertically mirrored L-shaped opaque black patterns 2401 that create discrete intensity gradients across the stripes.

When looking at the device from the revealing layer side while tilting it in ambient lighting, we can see the dark-bright wave patterns moving along the direction perpendicular to the revealing layer stripes (211, 212 and 213 in FIGS. 2, 903 and 904 in FIGS. 9, 1001 and 1002 in FIGS. 10, 111 and 112 in FIGS. 11, 171 and 172, FIG. 17).

The base layer consists of mirrored L-shape textured tiles. The sampling line elements of the revealing layer, e.g. embodied by cylindrical lenses, sample different horizontal lines on the base stripes. When the device is being tilted, differently positioned horizontal lines are sampled, for example darker ones or brighter ones. This creates the flashy beating effect. The local contrast in the level-line moiré, for example the one shown in FIG. 3B occurs due to the vertical displacements of the base layer stripes (base bands). These vertical displacements are generally equal or less than half the revealing layer period.

Figure 14:
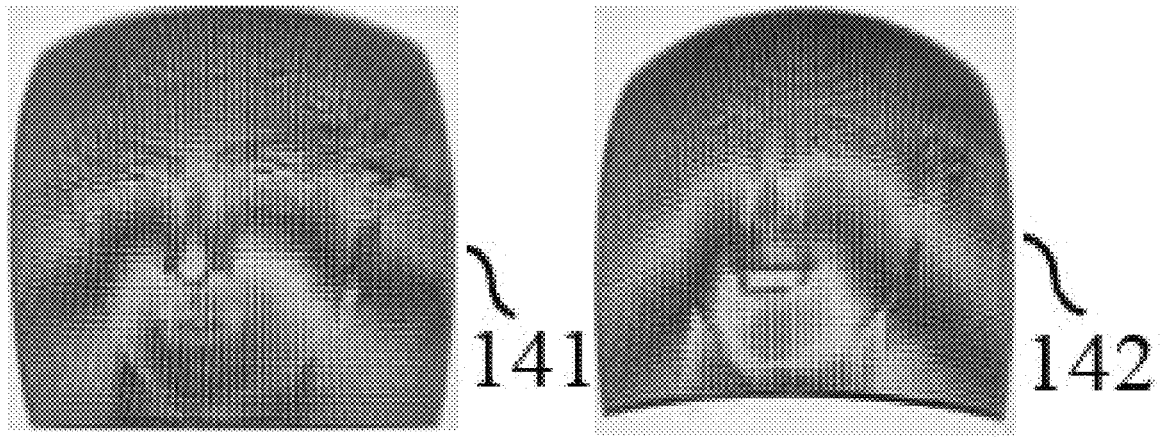
Figure 15:
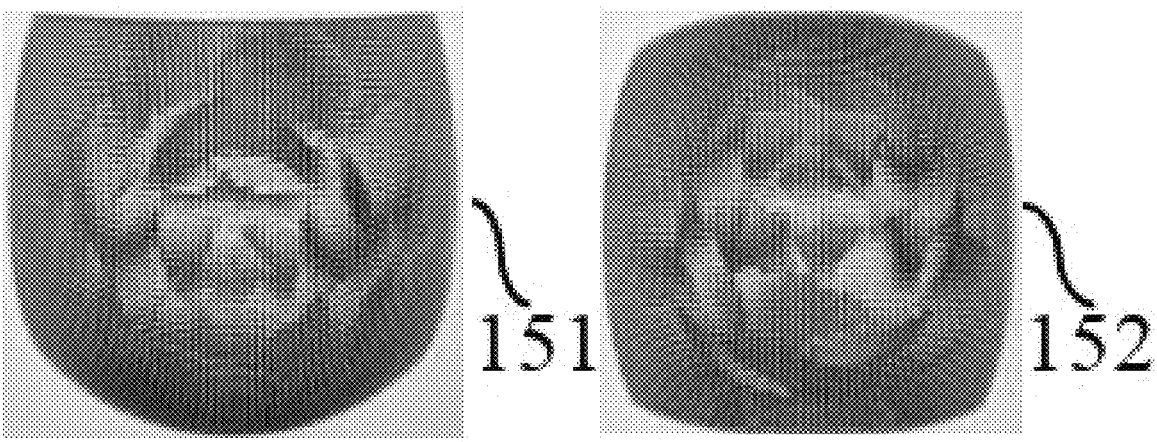
Figure 16:
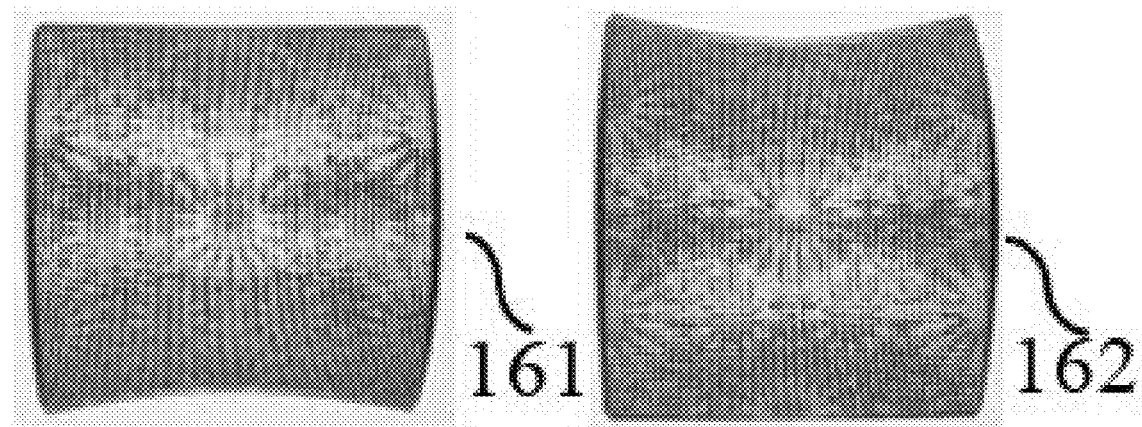
Figure 17:
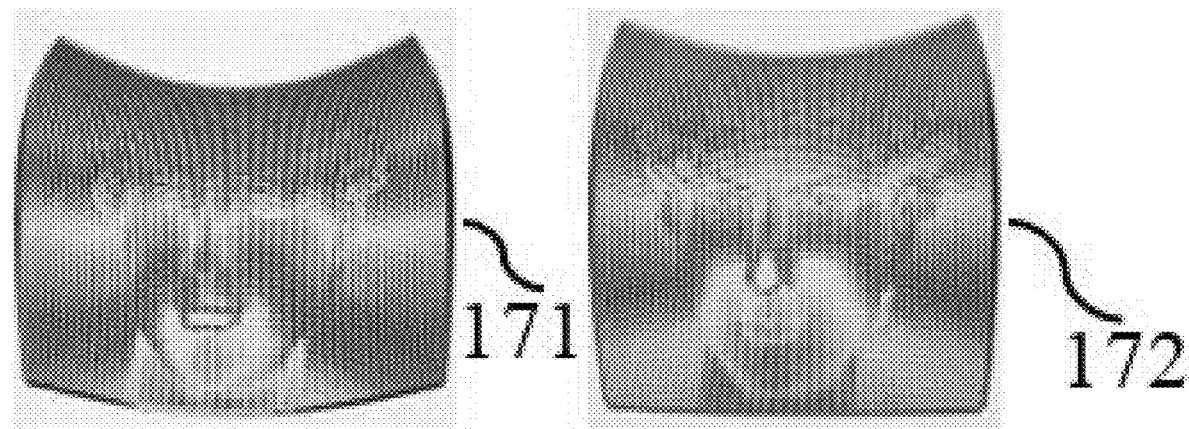
Figure 18:
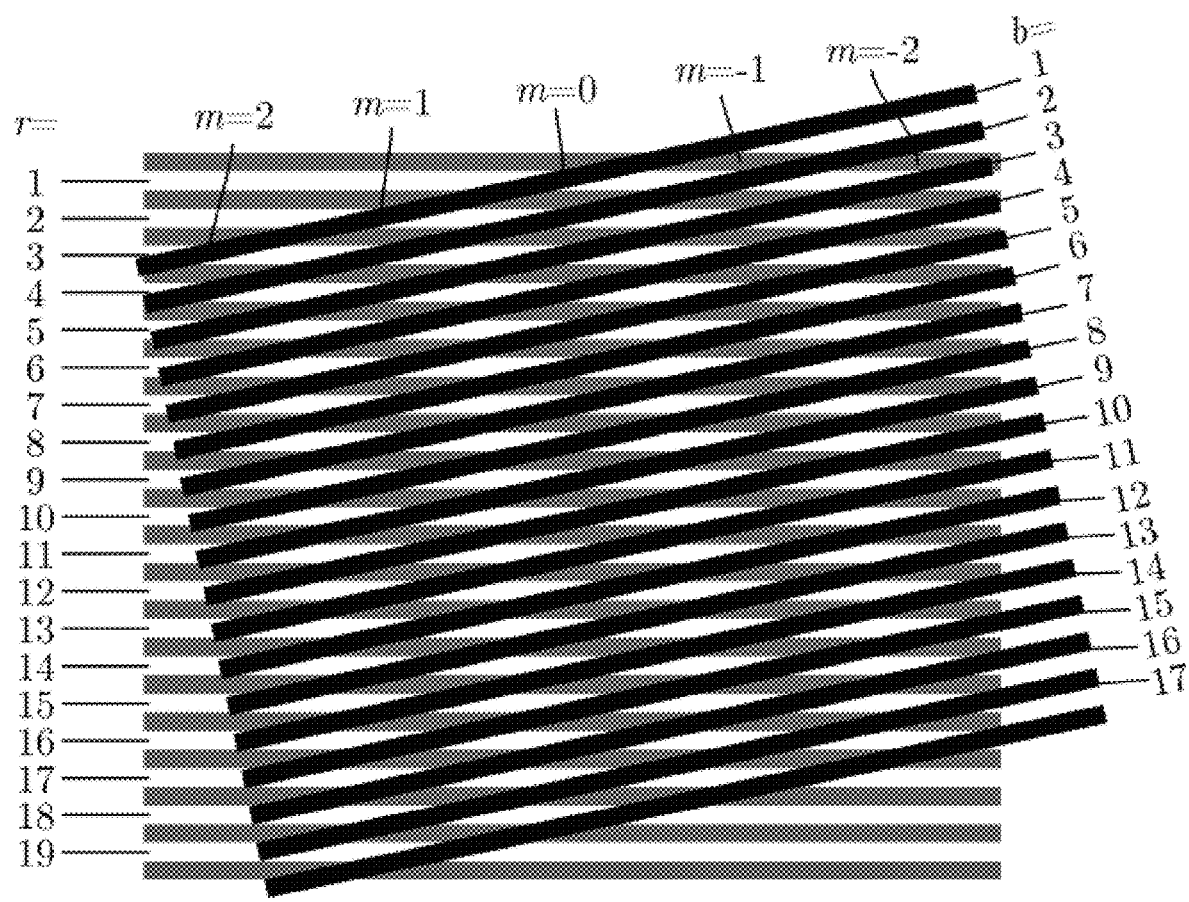
FIG. 18 shows the superposition of a revealing layer (shown as horizontal transparent lines on a gray background) and of a base layer (oblique black lines), where the transparent lines of the revealing layer are indexed with r, the black lines of the base layer indexed with b and the moiré fringe lines indexed with m.

Also, when looking at the device while tilting it, all regions of the device change their intensities. In addition, tilting the device modifies the relative observation orientation. This creates the dynamic effect where shapes seem to slightly shrink, grow or move. FIG. 14 shows this effect. In FIG. 14, 141, David's chin looks smaller than it looks in 142. FIG. 17 shows another example where the mouth of David is different in 171 and 172.

Regarding the "dual lens surface moiré", the base layer consists of another layer of cylindrical lenses instead of the mirrored "L" textured tiles. The cylindrical lenses lay preferably on an offset surface distant from the base layer and have local shifts in proportion to the input elevation profile. The light illuminates the device from behind. FIG. 9 shows the simulations of the dual lens surface moiré. Photographs of the 3D printed samples are illustrated in FIG. 10 and FIG. 11. A dual-lens sample fabricated according to the casting method is shown in FIG. 12. A "dual lens surface moiré" device is identifiable by showing a level-line moiré effect on its curved surface and by having on each of its two sides a grating of cylindrical lenses.

Applications

Daily life objects such as bottles, jewels, necklaces, clock armbands, and clothes could be decorated by curved surface level-line moirés. Such moirés would also be appropriate for illumination devices such as lampshades, where light flows out of the lamp and, simultaneously, visually attractive level-line moiré are generated. The lamp's exterior faces can be embodied by curved panels incorporating the superposed curved base and revealing layers.

CONCLUSION

We introduced a simple and practical method of extending level-line moiré to curved surfaces. Our results enable creating a novel high-quality moiré effect on surfaces which can be fabricated with different manufacturing approaches. From an artistic point of view, the proposed surface moiré technology exhibits interesting visual properties. Existing curved surface moiré devices are difficult to reproduce without having access to the design files. Curved surface moiré devices can therefore also be used for preventing the counterfeits of valuable objects.

NON-PATENT BIBLIOGRAPHY

[Amidror 2009] I. Amidror, "*The Theory of the Moiré Phenomenon: Volume I: Periodic Layers*", pp. 353-360 and pp. 370-371, Springer (2009).
[Blender 2019] Blender, Blender—a 3D modelling and rendering package, Blender Foundation, Blender Institute, Amsterdam (2019).
[Babaei et al. 2017] V. Babaei, J. Ramos, Y. Lu, G. Webster, and W. Matusik, "*Fabsquare: Fabricating photopolymer objects by mold 3dprinting and UV curing*," IEEE computer graphics applications, Vol 37, 34-42 (2017).
[Cadarso et al. 2013] V. J. Cadarso, S. Chosson, K. Sidler, R. D. Hersch, and J. Brugger, "*High-resolution 1d moirés as counterfeit security features*," Light. Sci. & Appl. Vol. 2, e86 (2013).
[Hecht 1075] E. Hecht, Schaum Outlines of Optics, Chapter 4, Section 4.3, Spherical refracting surfaces, p. 54 (1975)
[Kamal, Voelkl and Alda 1998] H. Kamal, R. Voelkel, and J. Alda, "*Properties of moiré magnifiers*," Opt. Eng., Vol. 37, 3007-3014 (1998).
[Papas et al. 2011] M. Papas, W. Jarosz, W. Jakob, S. Rusinkiewicz, W. Matusik, and T. Weyrich, "*Goal-based caustics*," in Computer Graphics Forum, Vol. 30 (Wiley Online Library, 2011), pp. 503-511.
[Schwartzburg et al. 2014] Y. Schwartzburg, R. Testuz, A. Tagliasacchi, and M. Pauly, "*High-contrast computational caustic design*," ACM Transactions on Graph. (TOG) Vol. 33, Issue 74 (2014).
[Walger et al. 2019] T. Walger, T. Besson, V. Flauraud, R. D. Hersch, and J. Brugger, "*1d moiré shapes by superposed layers of micro-lenses*," Opt. Express Vol. 27, 37419-37434 (2019).
[Walger et. Al. 2020] T. Walger, T. Besson, V. Flauraud, R. D. Hersch, and J. Brugger, "*Level-line moirés by superposition of cylindrical microlens gratings*," JOSA A, Vol. 37, 209-218 (2020).
[Weyrich et al. 2009] T. Weyrich, P. Peers, W. Matusik, and S. Rusinkiewicz, "*Fabricating microgeometry for custom surface reflectance*," ACM Trans. Graph., Vol. 28, Issue 3, Article 32, (2009).

The invention claimed is:

1. A method for producing a curved surface level-line moiré device formed by a curved revealing layer made of a curved grating of cylindrical lenses superposed with a curved base layer formed by a grating of shifted bands, said method comprising the steps of:
   (i) defining a curved surface on which the level-line moiré is to appear;
   (ii) creating a planar level-line moiré design by selecting an elevation profile, by defining the common repetition period of planar instances of the grating of cylindrical lenses and of the grating of bands and by shifting said grating of bands according to said elevation profile;
   (iii) projecting the grating of cylindrical lenses onto said curved surface thereby obtaining a curved pitch surface;
   (iv) calculating the curvature radii of the cylindrical lenses that are placed onto the curved pitch surface, thereby obtaining the curved grating of cylindrical lenses;
   (v) laying out the grating of shifted bands as a smooth surface at distances below the pitch surface, said distances being equal or larger than the curvature radii of the cylindrical lenses located above them, thereby obtaining the curved base layer;
   (vi) creating the meshes of the curved base layer and of the curved revealing layer including the curved grating of cylindrical lenses;
   (vii) with the created meshes fabricating the curved surface level-line moiré device;
where the elevation profile represents a recognizable shape that is reproduced as a level-line moiré on the fabricated curved surface level-line moiré device.

2. The method of claim 1, wherein:
   (a) the grating of shifted bands is formed by tiles having partly transparent and partly opaque regions or partly transparent and partly reflecting regions, said regions creating across the individual bands an intensity gradient,
   (b) the curvature radii are calculated to be proportional to the current cylindrical lens width, thereby ensuring a constant angular field of view; and
   (c) the recognizable shape is selected from a set of words, letters, numbers, flags, logos, graphic motifs, decorations, drawings, clip art, faces, houses, landscapes, trees, humans and animals.

3. The method of claim 1, wherein:
   (a) the shifted bands of said curved base layer are formed by cylindrical lenses that direct light from behind the curved surface towards the cylindrical lenses of the revealing layer,
   (b) shifting the grating of bands shifts the cylindrical lenses of the curved base layer and has the effect of directing light from a different orientations towards the observer.

4. The method of claim 1, where when observing the curved surface level-line moiré device from different angles, or when tilting it, dynamically beating moiré shapes appear whose different parts evolve from bright to dark and from dark to bright, without fundamentally changing their general aspect.

5. The method of claim 1, where before fabricating the curved surface level-line moiré device, its quality is optimized by defining the smooth surface of step (v) as an interpolation surface obtained with following sub-steps:
- (a) create a focal surface according to the focal distances measured from the top of the cylindrical lenses;
- (b) create offset surfaces that have constant offsets from the pitch surface;
- (c) create interpolation surfaces between the focal and the offset surfaces;
- (d) simulate the curved level-line moiré obtained by said interpolation surfaces;
- (e) select the set of parameters of the interpolation surface and its corresponding meshes that yield the visually highest quality moiré.

6. The method of claim 1, where fabrication is selected from a set of technologies comprising 3D printing, spray coating and casting, wherein
- (a) 3D printing is carried out with at least two materials selected from a set of transparent and opaque materials or from a set of transparent and reflecting materials,
- (b) spray coating implies fabricating a base mask layer having holes that after spray coating create intensity gradients across the bands of said curved base layer and
- (c) casting implies the fabrication of a mold whose surface is the negative of the surface of the curved surface level-line moiré device.

7. The curved surface level-line moiré device of claim 1 whose level-line moiré shape appears on an item selected from a set of decorative packages, aesthetical items, home decorations, lampshades, necklaces, watch elements, fashion clothes, cars, outdoor decorations, architectural elements and illumination devices.

8. The curved surface level-line moiré device of claim 1 whose curved surface is part of a surface selected from a set of parametric surfaces, paraboloid surfaces, saddle surfaces, conic surfaces, sphere surfaces and ellipsoid surfaces.

* * * * *